United States Patent
Masny et al.

(10) Patent No.: US 12,120,245 B2
(45) Date of Patent: *Oct. 15, 2024

(54) LATTICE BASED SIGNATURES WITH UNIFORM SECRETS

(71) Applicant: Visa International Service Association, San Francisco, CA (US)

(72) Inventors: Daniel Masny, San Francisco, CA (US); Yilei Chen, Palo Alto, CA (US); Rouzbeh Behnia, Tampa, FL (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,396

(22) Filed: Sep. 1, 2023

(65) Prior Publication Data

US 2023/0412392 A1 Dec. 21, 2023

Related U.S. Application Data

(63) Continuation of application No. 17/760,745, filed as application No. PCT/US2020/052296 on Sep. 23, 2020, now Pat. No. 11,784,825.

(Continued)

(51) Int. Cl.
*H04L 9/32* (2006.01)
*H04L 9/08* (2006.01)
*H04L 9/30* (2006.01)

(52) U.S. Cl.
CPC .......... *H04L 9/3247* (2013.01); *H04L 9/0825* (2013.01); *H04L 9/3093* (2013.01)

(58) Field of Classification Search
None
See application file for complete search history.

(56) References Cited

U.S. PATENT DOCUMENTS

| 9,634,840 B2 | 4/2017 | Hoffstein et al. |
| 9,722,798 B2 | 8/2017 | Hoffstein et al. |

(Continued)

FOREIGN PATENT DOCUMENTS

| CN | 102822816 A | 12/2012 |
| CN | 106301789 A | 1/2017 |

(Continued)

OTHER PUBLICATIONS

Buchmann, J., Göpfert, F., Güneysu, T., Oder, T. and Pöppelmann, T., 2016, May. High-performance and lightweight lattice-based public-key encryption. In Proceedings of the 2nd ACM international workshop on IoT privacy, trust, and security (pp. 2-9). (Year: 2016).*

(Continued)

*Primary Examiner* — Luu T Pham
*Assistant Examiner* — Edward X Long
(74) *Attorney, Agent, or Firm* — Kilpatrick Townsend & Stockton LLP

(57) ABSTRACT

Improvements to post-quantum lattice-based digital signature schemes are disclosed. By sampling cryptographic material, including cryptographic key matrices and masking vectors from a uniform distribution, embodiments eliminate the need for a security check during generation of a digital signature vector. As a result, digital signatures can be generated faster and at a lower failure rate. A generating device can generate a verification matrix A and a secret matrix S from a uniform distribution, and an error matrix E from a special distribution (such as a Gaussian). The generating device can combine the three matrices to generate a public matrix Y. The first and the fourth matrices (A, Y) can be used as a public key used to verify digital signatures. The second and the third matrices (S, E) can be used as a private key used to generate digital signatures.

19 Claims, 8 Drawing Sheets

Related U.S. Application Data

(60) Provisional application No. 62/906,569, filed on Sep. 26, 2019.

(56) References Cited

U.S. PATENT DOCUMENTS

| | | | |
|---|---|---|---|
| 10,129,029 | B2 | 11/2018 | Lyubashevsky et al. |
| 10,277,403 | B2 | 4/2019 | Hoffstein et al. |
| 11,050,557 | B2 | 6/2021 | Bhattacharya et al. |
| 2008/0037774 | A1 | 2/2008 | Slavin |
| 2013/0010953 | A1 | 1/2013 | Seurin et al. |
| 2015/0067336 | A1 | 3/2015 | Ding |
| 2018/0309574 | A1 | 10/2018 | Lyubashevsky et al. |
| 2018/0337899 | A1 | 11/2018 | Becker et al. |
| 2019/0305955 | A1 | 10/2019 | Verma et al. |
| 2020/0304305 | A1 | 9/2020 | Garcia Morchon et al. |

FOREIGN PATENT DOCUMENTS

| | | |
|---|---|---|
| CN | 110100413 A | 8/2019 |
| CN | 110138549 A | 8/2019 |
| KR | 101523053 B1 | 5/2015 |
| KR | 101621388 B1 | 5/2016 |

OTHER PUBLICATIONS

Pöppelmann, T, and T Güneysu. "Towards practical lattice-based public-key encryption on reconfigurable hardware." In Selected Areas in Cryptography—SAC 2013: 20th International Conference, Burnaby, BC, Canada, Aug. 14-16, 2013, Revised Selected Papers 20, pp. 68-85. Springer Berlin Heidelberg (Year: 2014).*

U.S. Appl. No. 17/760,745, Non-Final Office Action, Mailed on Feb. 17, 2023, 17 pages.
U.S. Appl. No. 17/760,745, Notice of Allowance, Mailed on Jun. 1, 2023, 18 pages.
Bai et al., "An Improved Compression Technique for Signatures Based on Learning with Errors", 18th International Conference, Feb. 25, 2014, 27 pages.
Behnia, "On Removing Rejection Conditions in Practical Lattice-Based Signatures", International Conference on Post-Quantum Cryptography, Jul. 15, 2021, pp. 380-398.
Bindel et al., "Lattice-Based Signature Schemes and their Sensitivity to Fault Attacks", IEEE, Workshop on Fault Diagnosis and Tolerance in Cryptography (FDTC), 2016, pp. 63-77.
Cayrel et al., "A Lattice-Based Threshold Ring Signature Scheme", Progress in Cryptology-LATINCRYPT, International Conference on Cryptology and Information Security in Latin America, 2010, pp. 255-272.
Application No. CN202080065383.4, Office Action, Mailed on Aug. 10, 2022, 13 pages.
Application No. CN202080065383.4, Office Action, Mailed on Apr. 27, 2023, 14 pages.
Application No. EP20868214.6, Extended European Search Report, Mailed on Oct. 19, 2022, 8 pages.
Application No. PCT/US2020/052296, International Search Report and Written Opinion, Mailed on Jan. 5, 2021, 7 pages.
Bai et al., "An Improved Compression Technique for Signatures Based on Learning With Errors", Cryptology E-Print Archive, Paper 2013/838, Available online at https://ia.cr/2013/838, Jan. 22, 2014, pp. 1-27.
Application No. SG11202202181V, Written Opinion, Mailed On Jun. 24, 2024, 8 pages.

* cited by examiner

LWE Problem $$A^T \cdot S^T + E^T \equiv_q Y^T$$

SEARCH: Given (A, Y) find S or E

DECISION: Given (A, Y), decide if LWE sample or Random

*FIG. 2*

| $(SK, PK) \leftarrow KeyGen(1^\kappa)$ |
|---|
| 301: $A \leftarrow \mathbb{Z}_q^{n \times m}$ |
| 302: $S \leftarrow \mathbb{Z}_q^{h \times n}, E \leftarrow D_1^{h \times m}$ |
| 303: $Y := SA + E \bmod q$ |
| 304: $PK := (A, Y), SK := (S, E)$ |

— 300

| $s, c \leftarrow Sign(SK, \mu)$ |
|---|
| 311: $r \leftarrow \mathbb{Z}_q^{1 \times n}$ |
| 312: $c := H(\mu, \lfloor rA \rceil \bmod q)$ |
| 313: $v = rA - cE$<br>IF:<br>$\|\lfloor v \rceil_{2^\lambda}\|_\infty \in BAD_1$<br>*Restart* |
| 314: $z := r + cS$ |

— 310

| $\{0,1\} \leftarrow Verify(\langle z, c \rangle, \mu, PK)$ |
|---|
| 321: $v' = zA - cY$<br>$w := \lfloor v' \rceil$ |
| 322: IF:<br>$c == H(\mu, w)$<br>*Valid* |

LATTICE BASED SIGNATURES WITH UNIFORM SECRETS

CROSS-REFERENCE TO RELATED APPLICATIONS

This application is a continuation of U.S. application Ser. No. 17/760,745 which is a 371 Application of international patent application number PCT/US2020/052296, having an international filing date of Sep. 23, 2020, which claims the benefit of the filing date of U.S. Provisional Patent Application No. 62/906,569, filed Sep. 26, 2019, the contents of which are incorporated by reference in their entirety for all purposes.

BACKGROUND

Many cryptosystems today, e.g. RSA encryption, are based on problems such as prime factorization or modular exponentiation. These problems are hard for conventional computers, but may not be for quantum computers. Thus new advances in quantum computing may render cryptosystems based on those problems unsecure. There is a need for new cryptosystems based on problems that are hard for both conventional computers and quantum computers.

Lattice-based problems can be used as the basis for cryptosystems. One example of a lattice problem may be the short integer solution problem, which relates to finding the shortest vector in an n-dimensional lattice of points. Lattice problems can be shown to be hard for both conventional and quantum computers. However, computing the cryptographic keys for lattice-based cryptosystems can be computationally expensive, and can result in large keys that also make it difficult to sign and verify messages. Therefore, there is a need to make lattice-based cryptography more efficient.

Embodiments of the present disclosure address these and other problems, individually and collectively.

SUMMARY

Embodiments of the present disclosure are directed to cryptography, including lattice-based signature schemes. A uniform random distributions to generate cryptographic keys and digital signatures, as opposed to, for example, using Gaussian distributions. The use of uniform random distributions can eliminate the need for a security check during signature generation, as well as the need for a signature check during signature verification. Consequently, both signature generation and verification can be faster. This is advantageous for low-latency or high-throughput applications where signatures should be generated and verified quickly.

One embodiment is directed to a method for performing secure communication using a digital signature, the method comprising performing, by a computer system: generating a verification matrix A comprising a first plurality of elements, the first plurality of elements sampled from a uniform distribution; generating a secret matrix S comprising a second plurality of elements, the second plurality of elements sampled from the uniform distribution; generating an error matrix E comprising a third plurality of elements, the third plurality of elements sampled from a special distribution; generating a public matrix Y based on a combination of the verification matrix A, the secret matrix S, the error matrix E, and a modulus q; generating a public key comprising the verification matrix A and the public matrix Y; generating a private key comprising the secret matrix S and the error matrix E; and transmitting the public key to a verifying device.

Another embodiment is directed to a method for performing secure communication using a digital signature, the method comprising performing, by a verifying device: storing a public key comprising a verification matrix A and a public matrix Y; receiving, from a signing device, a message m and a digital signature that includes a signature vector z and a first challenge vector c; generating a first verification vector v based on the verification matrix A, the public matrix Y, the signing vector z, and the first challenge vector c; generating a rounded verification vector w by discarding one or more of the least significant bits from the verification vector v; generating a second challenge vector by hashing the message m and the rounded verification vector w; comparing the first challenge vector c to the second challenge vector; and verifying the signing device in response to the first challenge vector c matching the second challenge vector.

Other embodiments are directed to a computer system comprising: a processor; and a non-transitory computer readable medium coupled to the processor, the non-transitory computer readable medium comprising code, executable by the processor for implementing any of the method described herein.

Terms

A "server computer" may include a powerful computer or cluster of computers. For example, the server computer can include a large mainframe, a mini-computer cluster, or a group of servers functioning as a unit. In one example, the server computer can include a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron, and/or Opteron; IBM and/or Motorola's PowerPC; IBM's and Sony's Cell processor; Intel's Celeron, Itanium, Pentium, Xeon, and/or Xscale; and/or the like processor(s).

The term "cryptographic key" may include data used in encryption or decryption. Cryptographic keys may be symmetrical, in which case the same key is used for encryption and decryption, or asymmetrical, in which case different keys are used for encryption and decryption. An asymmetric key pair may comprise a public key and a private or secret key. The public key may be made publicly available to any number of entities, while the private key may be distributed only to specific entities. An asymmetric key pair may be used as the basis of a digital signature scheme.

A "digital signature" may refer to data used to verify the source or authenticity of digital messages. Digital signatures may be implemented using cryptographic keys. A message may be sent to a recipient along with a corresponding digital signature. The digital signature may comprise an encrypted copy of the message (or data derived from the encrypted copy of the message) encrypted using a private key corresponding to the sending device. The recipient can use a corresponding public key to decrypt the encrypted copy of the message, then compare the encrypted copy against the received message. Provided the messages match, and the private key has not been leaked, the digital signature verifies that the message was sent by the sending device and not an imposter.

A "message" may refer to any data that may be transmitted between two entities. A message may comprise plaintext (unencrypted) data or ciphertext (encrypted) data. A message may comprise alphanumeric sequences (e.g., "hello123") or any other data (e.g., image or video files). Messages may be transmitted between computers or other entities.

A "hash function" may refer to any function that can be used to map data of arbitrary length or size to data of fixed length or size. A hash function may be used to obscure data by replacing it with its corresponding "hash value."

A "challenge" may refer to data used to prove knowledge or possession of something (e.g., data). For example, a challenge may comprise a hash value corresponding to a data element. An entity may prove that it possesses the data element by providing the hash value, as it is statistically unlikely that the entity could produce the hash value without possessing the corresponding data element.

The term "generating device" may refer to a device or computer system that generates cryptographic keys. These may include asymmetric cryptographic keys used to implement a digital signature scheme. A generating device may distribute a public "verifying" key to verifying devices in a network, such that those verifying devices can use the public key in order to verify digital signatures. A generating device may distribute a private "signing" key to signing devices in a network, such that those signing devices can use the private key to generate digital signatures corresponding to messages.

The term "signing device" may refer to a device or computer system that uses a private signing key to generate digital signatures. In some cases, a signing device may be a generating device, i.e., the signing device generates digital signatures using a private signing key it generated itself.

The term "verifying device" may refer to a device or computer system that uses a public verification key to verify digital signatures generated by signing devices. In some cases, a verifying device may be a generating device, i.e., the verifying device verifies digital signatures using a public verification key it generated itself.

The term "uniform distribution" may refer to a probability distribution (i.e., probability density function or probability mass function) where possible values associated with a random variable are equally possible. A fair dice is an example of a system corresponding to a uniform distribution (in that the probability of any two rolls are equal). The term "non-uniform distribution" may refer to a probability distribution where all possible values or intervals are not equally possible. A Gaussian distribution is an example of a non-uniform distribution.

The term "user device" may refer to a device owned or operated by a user. Examples of user devices include smartphones, laptop computers, tablets, PDAs, and wearable devices such as smart watches. A user device may be portable and handheld. A user may use a user device to perform interactions with other entities. For example, a user may use a user device to participate in an e-commerce transaction with a merchant (e.g., via the merchant's website).

The term "authorizing entity" or "authorization computer" may refer to an entity which can authorize or approve interactions. An authorizing entity may refer to a business entity (e.g., a bank) that maintains an account for a user and is capable of authorizing interactions such as payment transactions, for example, the purchase of goods or services. An authorizing entity may operate an authorization computer.

BRIEF DESCRIPTION OF THE DRAWINGS

FIG. 2 shows a learning with errors (LWE) problem for digital signatures involving a public key (A, Y) and a private key (S, E) according to some embodiments of the present disclosure.

FIG. 3 illustrates the generation of keys and a digital signature, as well as digital signature verification according to embodiments of the present disclosure.

DETAILED DESCRIPTION

Figure 1:
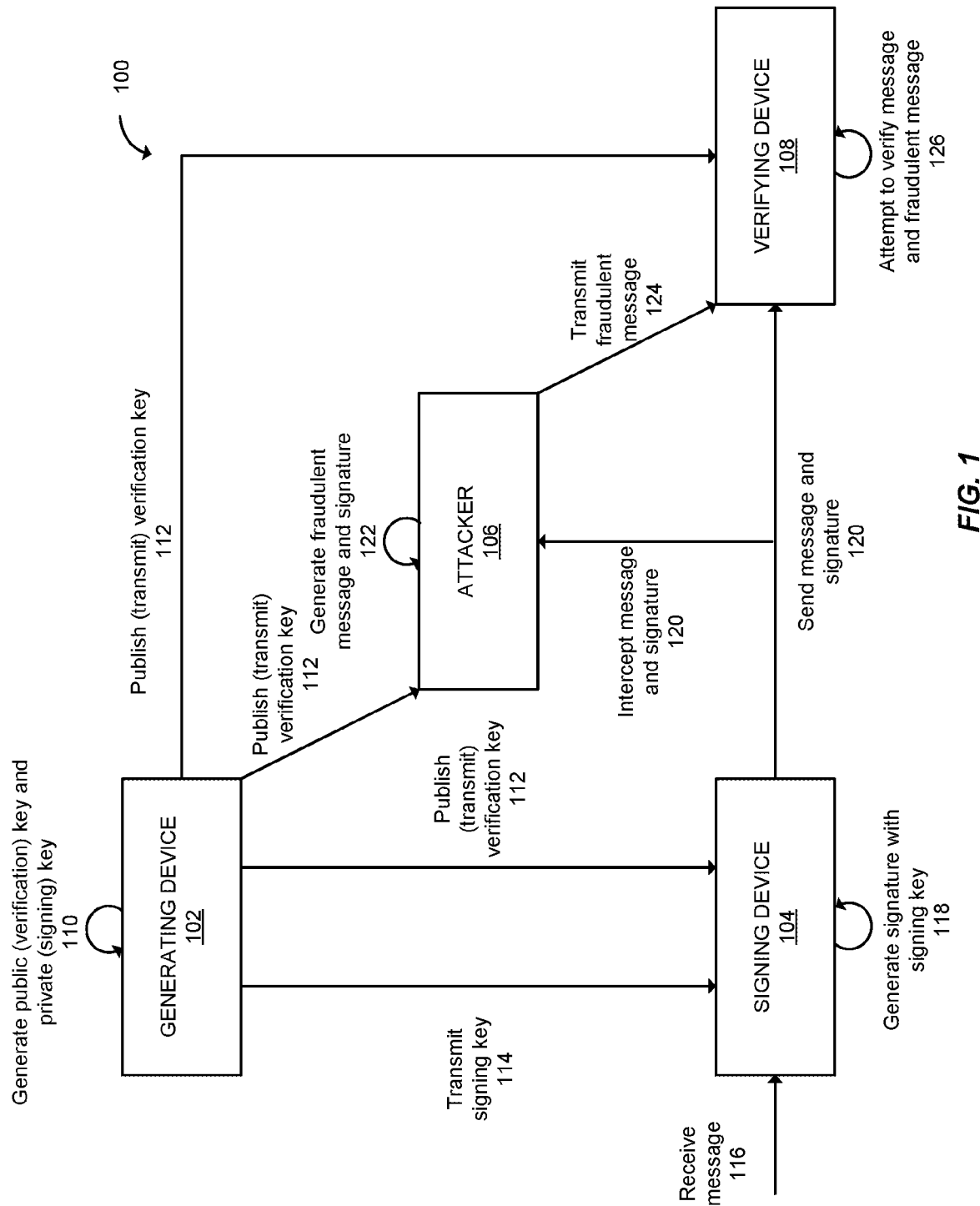
FIG. 1 shows a system diagram of a model digital signature system according to some embodiments.

Some embodiments of the present disclosure are directed to improvements to lattice-based signature schemes used to produce and verify digital signatures. These digital signature schemes are useful because they allow recipients to verify the source and correctness of digital messages. As such, they may be useful for securely communicating over open networks such as the Internet.

Many digital signature schemes are based on underlying cryptosystems, which are themselves based on "computationally hard" math problems. If a malicious actor can break the underlying cryptosystem (e.g., by solving the underlying problem and determining a private cryptographic key), the malicious actor can forge digital signatures. These computationally hard problems are mostly infeasible for existing computer systems, which may need hundreds or thousands of years of processing time to break such systems. However, some of these problems are not computationally hard for theoretical quantum computers. As an example, a sufficiently powerful quantum computer can use Shor's algorithm to perform prime factorization, breaking the RSA cryptosystem, and any signature schemes based thereon.

Lattice-based problems, such as the short integer solution (SIS), Learning with Errors (LWE), and the Adaptive Bounding Distance Decoding (ABDD) problem are computationally hard for both quantum and non-quantum computers. As such, these problems can be used as the basis of post-quantum digital signature schemes. One such scheme is known as "Fiat-Shamir with Aborts." However, current lattice-based cryptosystems suffer from performance issues that make them difficult to implement in practice. For example, generating cryptographic keys for lattice-based cryptosystems can be computationally expensive and time consuming. Additionally, signing messages may be probabilistic and prone to failure, increasing the total amount of time it takes to sign and transmit a message. Further, cryptographic keys may be large and it may be difficult to use these keys to sign and verify messages. As such, current quantum-based post-quantum signature schemes are inappropriate for high-throughput or low-latency systems.

One problem in particular with lattice-based schemes is the probabilistic nature of digital signature generation. Typically, in lattice-based schemes, a digital signature comprises a challenge vector c and a signature vector z. A verifying device (i.e., a device that verifies the digital signature) uses the signature vector z and a public cryptographic key to try and reproduce the challenge vector c. If the verifying device can successfully reproduce the challenge vector, the digital signature is legitimate. However, the process used to generate the digital signature is not guaranteed to generate a challenge vector c that can be reproduced. Moreover, there is a chance that the signature vector z is insecure, i.e., that it reveals some information about the private key used to generate the digital signature.

Typically, the digital signature generation process involves generating a random vector r by sampling from a Gaussian distribution, then using the random vector r along with the private cryptographic key to generate the challenge vector c and signature vector z. Then, the challenge vector c and signature vector z are checked in a correctness test (i.e., verifying that the digital signature can be verified correctly) and a security test (i.e., verifying that the signature vector z does not leak any information about the private cryptographic key). If one or both tests (checks) fail, signature generation restarts, and a new random vector r is sampled, a process sometimes referred to as "rejection sampling."

Because both tests need to be passed during signature generation, the signature generation process can be very time consuming. Some systems expect at least 10 attempts before a valid and secure signature is generated. Embodiments of the present disclosure however, are able to generate correct, secure digital signatures without performing the security check on the signature vector z. As a result, the probability of generating a valid signature is higher, and the total time it takes to generate a valid digital signature is reduced. Some implements of embodiments reduced the expected number of repetitions needed to generate a correct signature to 1.52 (see Table 3 below), allowing embodiments to be used for high-throughput or low latency applications.

Some embodiments can eliminate the need for the security check by generating cryptographic keys and the random vector r using uniform randomness as opposed to gaussian randomness. The use of uniform randomness makes it impossible for the signature vector z to leak any information about the private cryptographic key, thus eliminating the need for a security check.

I. VERIFICATION USING SIGNATURES

FIG. 1 shows a system and sequence diagram of a digital signature system 100 according to some embodiments of the disclosure. This system comprises four devices, a generating device 102, a signing device 104, an attacker 106, and a verifying device 108. Generally, the generating device 102 generates the cryptographic keys used to generate digital signatures and verify those digital signatures, including a public verification key, and a private signing key. The signing device 104 uses the signing key to sign a message, and sends the signed message to a verifying device 108. The verifying device 108 receives messages and uses the public verification key to verify those messages. Also included in the system is an attacker 106, a malicious entity who attempts to produce fraudulent signatures that are indistinguishable from real signatures.

As an example, the signing device 104 could comprise a user device corresponding to an account holder. The user may want to transfer funds from their account to another account (for example, in order to pay for a good or service, as a gift, etc.). The verifying device 108 may be associated with an issuer or issuing bank that maintains an account on behalf of the user. The signing device 104 may send a message initiating the transfer of funds between the user and their intended recipient. The signing device 104 may sign the message in order to indicate that the fund transfer was initiated by the user. In this example, the attacker 106 may comprise a cybercriminal that wants to generate fraudulent messages and signatures. Using these fraudulent messages and signatures, the attacker 106 can attempt to convince the verifying device 108 to approve fraudulent fund transfers, e.g., into an account owned by the attacker 106. One goal of the system 100 is to insure the security and correctness of generated signatures. That is, insuring that legitimate signatures can be correctly verified by the verifying device 108, but cannot be generated by the attacker 106.

At step 110, the generating device 102 can generate a public verification key and a private (secret) signing key. The private key can be used to generate digital signatures and the public key can be used to verify digital signatures. As the private key is used to generate signatures, it is important that it isn't leaked or otherwise disclosed to the attacker 106. An exemplary method used to generate these cryptographic keys is described in more detail below in Section II. Generally, these cryptographic keys comprise paired matrices, each comprising a collection of elements. These elements comprise numbers sampled from random (or cryptographically secure pseudorandom) distributions, including both a uniform distribution and a non-uniform distribution (e.g., a Gaussian distribution).

After generating the cryptographic keys, at step 112 the generating device 102 can publish the public verification key. This publication can comprise making the verification key freely available to all devices in a particular network (e.g., the Internet), for example, by hosting the public key on a webserver. Alternatively, the generating device 102 can transmit the verification key to all other devices in the network, i.e., the signing device 104, the attacker 106, and the verifying device 108.

At step 114, the generating device 102 can transmit the signing key to signing device 104. Possession of the signing key enables the signing device 104 to generate digital signatures. Other devices that don't possess the signing key (i.e., attacker 106 and verifying device 108) should not be able to generate digital signatures that can be verified successfully.

Notably, in some embodiments, the generating device 102 and the signing device 104 may comprise a single device, that is, the same device may generate and use the signing key to generate digital signatures. Likewise, in some embodiments, the generating device 102 and the verifying device 108 may comprise a single device.

Optionally, at step 116, the signing device 104 can receive a message m. For example, a user of the signing device 104 can input a message m using a keyboard or other input device. As another example, the signing device 104 could receive a message m from another device that delegates cryptographic operations to signing device 104, such as a computer system that is incapable of performing computationally demanding cryptographic operations. Alternatively, the signing device 104 can generate the message m itself, and may not receive the message at step 116. The message m may comprise any data that can be transmitted in electronic form. Thus digital files, digital media (such as movies, audio files, etc.) are messages.

At step 118, the signing device 104 can generate a digital signature for the message m using the signing key. This digital signature (sometimes referred to as sig) may comprise two vectors: a challenge vector c, and a signature vector z. An exemplary method for generating the digital signature is described below with reference to Section III. In brief, the signing device 104 uses the message, the public verification key, and a uniform random vector (sometimes referred to as a "masking vector") r as the input to a hash function H to produce the challenge vector c. Using the challenge vector c, the private key, and the random vector r, the signing device 104 can produce the signature vector z. The digital signature may comprise both the challenge vector c and the signature vector z.

At step 120, the signing device 104 can send the message and digital signature to the verifying device 108, via, for example, an unsecured network such as the Internet. At this time the attacker 106 may intercept the message and signature.

At step 122, the attacker 106 may generate a fraudulent message and attempt to generate a fraudulent signature. The attacker 106 may attempt to break the signature system using the message m, signature (c, z), and the public key. Further, the attacker 106 may have access to a quantum computer capable of breaking conventional cryptosystems (e.g., capable of performing prime factorization in polynomial time). However, because the signatures are based on a quantum safe, lattice-based cryptosystem, the attacker 106 has a vanishingly small probability of generating a fraudulent digital signature that can be verified correctly.

At step 124, the attacker 106 can transmit its fraudulent message and attempted fraudulent signature to the verifying device 108. As stated above, the attacker 106 may produce and send a fraudulent message in order to defraud an owner or operator of the verifying device 108. For example, the attacker 106 may try and trick the verifying device 108 to approve a fraudulent transfer of funds to an account owned by the attacker 106.

At step 126, the verifying device 108 can attempt to verify the message m and the fraudulent message. The verifying device 108 can use a method, such as the method described below with reference to Section IV, in order to verify the message and the fraudulent message. In short, the verifying device 108 can attempt to create its own challenge vector using the message, public verification key, and the digital signature. If the challenge vector matches the challenge vector c included in the digital signature, the verifying device 108 verifies that the signature is legitimate.

Because the attacker 106 is unable to determine either the random vector r (used to generate the challenge vector c and the signature vector z) or any of the secret key material, the attacker 106 has a vanishingly small probability of generating either a correct challenge vector c or a correct signature vector z. Consequently, the verifying device 108 will be unable to reproduce the fraudulent challenge vector. As a result, the verifying device 108 can identify that the fraudulent message and fraudulent signature are fraudulent.

II. LATTICE-BASED SIGNATURE SYSTEMS

Due to the emergence of quantum computers, there is interest in the development of digital signatures with post-quantum security. Some approaches for constructing signature schemes are based on computational intractability assumptions related to lattices. Common assumptions are the hardness of the learning with errors (LWE) problem or the short integer solution (SIS) problem. Both of these problems are related to solving the shortest vector problem in a lattice [Reg09].

The beginning of lattice-based signatures can be traced back to Goldreich et al. [GGH97] and the NTRU signature scheme [HHP+03], with the public verification key and the secret signing key being a "bad" basis and a "good" basis of a lattice. However, the initial schemes were broken since signatures leaked information about the secret "good" basis. By obtaining sufficiently many signatures, the secret "good" basis could be completely recovered [GS02, NR06].

This changed with the trapdoor mechanism proposed by Gentry et al. [GPV08]. Their trapdoor mechanism allowed them to produce a signature securely without leaking the signing key following the full-domain hash paradigm. When relying on the NTRU problem, this approach led to efficient signatures. This approach has been less fruitful for (Ring)-LWE or (Ring)-SIS, since it has led to large key and signature sizes.

A different method for constructing digital signatures is a technique called Fiat-Shamir [FS86]. In his work "Fiat-Shamir with Abort" Lyubashevsky [Lyu09] made this method applicable to the realm of (Ring)-LWE and (Ring)-SIS. One of the key ideas aborting in case information of the secret key is leaked. This process of rejection and resampling, i.e., rejection sampling, helped to ensure correctness and security and led to a line of signature schemes based on (Ring)-LWE and (Ring)-SIS [Lyu12, GLP12, DDLL13, BG14, DLL+18, KLS18, ABB+19].

Dilithium [DLL+18], one of the candidates of NIST's post-quantum cryptography standardization, follows the "Fiat-Shamir with Abort" method but also adds several optimizations like applying a compression technique to the public key to significantly decrease the public key size with the cost of a slight increase in signature size. Dilithium also replaces Gaussian sampling during signature generation, making it immune to a venue of attacks targeting this process. However, similar to all its predecessors, signing crucially relies on rejection sampling.

From a more technical perspective, the ideas of "Fiat-Shamir with Abort" can be described as follows. A simplified version of Lyubashevsky's scheme [Lyu12] due to Bai and Galbraith [BG14] in the ring setting is presented. Let A be a vector of Ring elements in $R_q = \mathbb{Z}_q[x]/(x^n+1)$. The secret key S is sampled from a Gaussian-like distribution over $R_q$. The public key PK consists of A and Y≈SA.

For signing a message m, one runs the following three steps:

1. Sample r from a Gaussian-like distribution over $R_q$, compute w=HighBits(rA).
2. Compute H(w, pk, m)=c, where c is a small ring element in $R_q$.
3. Compute z=r+cS∈R, then check the following two conditions. If they are satisfied, output signature (z, c); if they are not satisfied, restart from the first line. A condition (a) is whether r+cS is sufficiently small and does not leak the secret S. A condition (b) is whether HighBits(zA−cY)=w.

The verification algorithm accepts if z is sufficiently small and H(w, m)=c. For the security of the scheme, it is important that z is small, since only then breaking the scheme would lead to solving short integer solution (SIS). But this brings the challenge that r needs to be small as well and hence might not completely mask the sensitive term cs. Carefully tailored rejection sampling resolves this issue.

The scheme has a second rejection step, namely that HighBits(zA−cY)=HighBits(rA) needs to hold. This is important for correctness, but it also plays a role in security since it could expose a noise term that perturbs SA to Y.

Embodiments of the present disclosure make a substantial change to the "Fiat-Shamir with Abort" approach for lattice-based schemes. Usually, it appears that it is important for the security of a scheme that a signature needs to be small. However, embodiments of the present disclosure include a signature scheme where this is not the case. This brings several advantages over previous schemes. Embodiments of the present disclosure are able to remove the rejection condition in step 3.(a). This also allows embodiments to sample the secret matrix S and the "masking" term (i.e., the random vector) r from a uniform distribution. This has the potential to make it more compatible with masking schemes to provide resistance against side-channel attacks and secret sharing techniques to distribute the secret key among different entities. Embodiments might also be a step toward constructing signatures from Learning Parity with Noise, which operates over the binary domain where a small secret, i.e., low Hamming weight, could not be masked by another small term, which has low Hamming weight as well. Further, embodiments of the present disclosure are easier to implement and adopt in practice.

One of the key aspects is reliance on the LWE problem rather than the SIS problem. Further, embodiments use a rounding technique. This rounding technique ensures correctness and that the hidden noise term perturbing parts of the public key remains hidden.

For security analysis, embodiments of the present disclosure can use different hard problems compared to existing FS-based lattice signature schemes. Concretely, the security of the signature can be based on (Ring)-LWE and an adaptive variant of the bounded distance decoding problem (ABDD). Section VII offer two example settings of parameters. The first one makes the ABDD problem statistically hard, which allows the scheme to have a tight security proof in the quantum random oracle model (QROM) model. The other one makes the ABDD problem computationally hard, which leads to schemes with smaller public keys. The concrete parameters offer different trade-offs among the public-key & signatures sizes, the rejection sampling rate, and the concrete security.

A. Preliminaries

Notations and terminology. In cryptography, the security parameter (denoted as $\kappa$) is a variable that is used to parameterize the computational complexity of the cryptographic algorithm or protocol, and the adversary's probability of breaking security. An algorithm is "efficient" if it runs in (probabilistic) polynomial time (ppt) over $\kappa$.

When a variable v is drawn uniformly randomly from the set S it is denoted as $$v \leftarrow U(S) \text{ or } v \xleftarrow{\$} S. \approx_s \text{ and } \approx_c$$

are used as the abbreviations for statistically close and computationally indistinguishable.

Let $\mathbb{R}, \mathbb{Z}, \mathbb{N}$ be the set of real numbers, integers, and positive integers, denote $\mathbb{Z}/q\mathbb{Z}$ by $\mathbb{Z}_q$. The rounding operation $\lfloor a \rceil_p: \mathbb{Z}_q \to \mathbb{Z}_p$ is defined as multiplying a by p/q and rounding the result to the nearest integer. For $n \in \mathbb{N}$, $[n]:=\{1, \ldots, n\}$.

A vector in $\mathbb{R}^n$ (represented in column form by default) is denoted by a bold lower-case letter, e.g., v. For a vector v, the $i^{th}$ component of v is denoted by $v_i$. A matrix is denoted as a bold capital letter, e.g., A. The $i^{th}$ column vector of A is denoted $a_i$. The length of a vector is the $\ell_p$-norm $\|v\|_p := (\Sigma v_i^p)^{1/p}$, or the infinity norm given by its largest entry $\|v\|_\infty := \max_i\{|v_i|\}$. The length of a matrix is the norm of its longest column: $\|A\|_p := \max_i\|a_i\|_p$. By default, the $\ell_2$-norm is used unless explicitly mentioned. A "small" or "short" vector or matrix refers to its norm, not its dimension, unless explicitly mentioned. The thresholds of "small" or "short" is precisely parameterized when necessary.

Lattices and the learning with errors problem. An n-dimensional lattice $\Lambda$ of rank $k \le n$ is a discrete additive subgroup of $\mathbb{R}^n$. Given k linearly independent basis vector $B=\{b_1, \ldots, b_k \in \mathbb{R}^n\}$, the lattice generated by B is $$\Lambda(B)=\Lambda(b_1, \ldots, b_k)=\{\Sigma_{i=1}^k x_i \cdot b_i, x_i \in \mathbb{Z}\}.$$

Recall the decisional learning with errors (LWE) problem.

Definition 2.1 (Decisional learning with errors [Reg09]). For n, $m \in \mathbb{N}$ and modulus $q \ge 2$, distributions for secret vectors, public matrices, and error vectors $\theta$, $\pi$, $\chi \subseteq \mathbb{Z}_q$. An LWE sample is obtained from sampling $S \leftarrow \theta^n$, $A \leftarrow \pi^{n \times m}$, $E \to \chi^m$, and outputting $(A, y^t := s^t A + E^t \mod q)$.

An algorithm can be considered to solve $LWE_{n,m,q,\theta,\pi,\chi}$ if it distinguishes the LWE sample from a random sample distributed as $\pi^{n \times m} \times U(\mathbb{Z}_q)$ with probability greater than $\frac{1}{2}$ plus non-negligible.

Lemma 2.2 (Hardness of LWE based on the lattice problems in the worst case [Reg09, Pei09, BLP+13, PRS17]). Given $n \in \mathbb{N}$, for any $m = \text{poly}(n)$, $q \ge 2^{\text{poly}(n)}$, Let $\theta = \pi = U(\mathbb{Z}_q)$, $\lambda = D\mathbb{Z}_s$, where $s \ge 2\sqrt{n}$. If there exists an efficient (possibly quantum) algorithm that breaks $LWE_{n,m,q,\theta,\pi,\chi}$, then there exists an efficient (possibly quantum) algorithm for solving GapSVP$\gamma$ and SIVP$\gamma$ on arbitrary n-dimensional lattices with overwhelming probability, for some approximation factor $$\gamma = \tilde{O}\left(\frac{nq}{s}\right).$$

Digital signatures. Recall the syntax and security definition of a digital signature scheme.

Definition 2.3 (Digital Signatures). A digital signature scheme for a message space M is a triplet of ppt algorithms (KGen, Sign, Verify) with the following syntax:

KGen: KGen takes as input $1^\kappa$ and outputs a key pair (pk, sk).

Sign: Sign takes as input sk, a message $m \in M$ and outputs a signature $\sigma$.

Verify: Verify takes as input pk, a message $m \in M$, a signature $\sigma$ and outputs 1 if $\sigma$ is a valid signature under pk for message m. Otherwise, it outputs 0.

For correctness, for any $m \in M$, we require that Verify(pk, m, $\sigma$)=1, where (pk, sk)$\leftarrow$KGen($1^\kappa$), $\sigma \leftarrow$Sign(sk, m).

Definition 2.4 (Existential Unforgeability under Chosen Message Attack (EUF-CMA) Security). A signature scheme SGN is (t, $\varepsilon$, $q_S$, $q_H$)-EUF-CMA secure (existential unforgeable under chosen message attacks) if for all algorithms A running in time at most t and making at most $q_S$ queries to the signing oracle and $q_H$ queries to the random oracle, $$Pr\begin{bmatrix} \text{Verify } (pk, m^*, \sigma^*) = 1 & (pk, sk) \xleftarrow{\$} KGen(1^\kappa) \\ \wedge (m^*, \sigma^*) \notin \{(m_i, \sigma_i) | i \in [q_S]\} & (m^*, \sigma^*) \xleftarrow{\$} A^{O_H;Sign(sk,\cdot)}(pk) \end{bmatrix} \leq \varepsilon,$$

where for $i \in [q_S]$, on the $i^{th}$ query m, the signing oracle Sign(sk, •) returns $$\sigma_i \xleftarrow{\$}$$

Sign(sk, m) to A and $O_H$ denotes query access to a random oracle.

B. Adaptive Bounding Distance Decoding

Embodiments of the present disclosure can be based on the security of the adaptive bounded distance decoding assumption. For some parameter choices, this problem has statistical hardness, in which case the signature construct receives a tight security proof in the QROM model. By relaxing the parameters, it is possible to only receive computational hardness.

Definition 3.1 (Bounded Distance Decoding (BDD)). Let q, n, m $\in \mathbb{N}$. Bounded distance decoding for tolerance set $B_1^m \subset \mathbb{Z}_q^m$, dimension n and challenge set $B^h \mathbb{Z}_q^h$ is $\varepsilon$-secure if for any ppt algorithm A $$Pr\begin{bmatrix} \exists E' \in B_1^m \text{ s.t} & A \xleftarrow{\$} \mathbb{Z}_q^{n \times m}, y \xleftarrow{\$} \mathbb{Z}_q^{h \times m} \\ y - z^* A = E' & z^* \xleftarrow{\$} A(A, y) \end{bmatrix}$$

where for $i \in [q_S]$, on the $i^{th}$ query m, the signing oracle Sign(sk, •) returns $$\sigma_i \xleftarrow{\$}$$

Sign(sk, m) to A and $O_H$ denotes query access to a random oracle.

Definition 3.2 (Adaptive Bounded Distance Decoding (ABDD)). Let q, n, m, h $\in \mathbb{N}$. Adaptive bounded distance decoding for a tolerance set $B_1^m \subset \mathbb{Z}_q^m$, dimension n and challenge set $B^h \subset \mathbb{Z}_g^h$ is $\varepsilon$-secure if for any ppt algorithm A $$Pr\begin{bmatrix} & A \xleftarrow{\$} \mathbb{Z}_q^{n \times m}, Y \xleftarrow{\$} \mathbb{Z}_q^{h \times m} \\ \exists E' \in B_1^m \text{ s.t} & (w^*, st) \xleftarrow{\$} A(A, Y) \\ w^* + cY - z^* A = E' & c \xleftarrow{\$} B^h \\ & z^* \xleftarrow{\$} A(c, st) \end{bmatrix} \leq \varepsilon$$

where st is a state of algorithm A.

In both regimes, i.e., the computational regime and the statistical parameter regime, bounded distance decoding can be reduced by a simple rewinding argument to adaptive bounded distance decoding. Note that in the statistical setting, the following lemma also holds for a quantum algorithm, since every quantum algorithm can be simulated by an unbounded algorithm.

Lemma 3.3. Let there be a rewindable algorithm A that $\varepsilon$-breaks the security of ABDD in time t for parameters q, n, m, h, challenge set $B^h$, where all differences of two elements are invertible, and tolerance set $B_1^m \subset \mathbb{Z}_q^m$. Then there is an algorithm A' that $\varepsilon'$-breaks the security of BDD in time t' for parameters q, n, m, and tolerance set $B_2^m$, where $$\varepsilon' \geq \varepsilon^2 - \frac{1}{|B|^h}, t' \leq 2t \text{ and } |B_2| \leq 2|B_1|.$$

Proof. Algorithm A' receives a BDD challenge (A, y) and needs to find a $z^*$ such that $y - z^* A = E'$ with $E' \in B_2^m$. A' samples two challenges $c_1$, $$c_2 \xleftarrow{\$} B^h.$$

It samples Y such that $(c_2 - c_1)Y = y$. This is possible unless $c_1 = c_2$ which happens with probability at most $1/|B^h|$. Otherwise Y is uniformly distributed given $c_1, c_2$.

A' invokes A on input A, Y to receive a response $w^*$. This is the rewinding point. A' runs A twice on time on $c_1$ to receive solution $z_1^*$ and on $c_2^*$ to receive $z_2^*$. A' outputs $z^* := z_1^* - z_2^*$.

By Jensen's inequality $z_1^*$ and $z_2^*$ will be correct at least with probability $\varepsilon^2$. Conditioned on that being the case, $$\exists E_1', E_2' \in B_1^m : y - z_1^* A = (c_1 - c_2)Y - (z_1^* - z_1^*)A = E_1' + E_2'.$$

holds for $z^*$. Hence, $E_1' + E_2' \in B_2^m$, for a set $B_2^m$ with $|B_2| \leq 2|B_1|$.

C. Digital Signature Scheme Overview

In most lattice-based signature schemes based on the FS paradigm (e.g., [BG14, DLL+18]), rejection sampling is done twice: 1) To solely ensure the computed signature does not leak the distribution of the secret key but correctness is not affected and 2) To ensure the correctness as well as the security of the scheme. Embodiments of the present disclosure overcome the first rejection sampling by sampling the secret matrix S and the masking term r from a uniform random distribution. Section VII discusses parameter selection where the (Ring)LWE problem is still hard when S and r are uniformly random. However, to ensure the correctness, a similar rejection sampling step can be used in some embodiments. This rejection sampling, which implies correctness, can later also help prove the security of the scheme by allowing messages to be signed by programming the random oracle without knowing the secret key.

The key generation algorithm can sample the secret matrix S from a uniform distribution and the error E from a bounded distribution D. To sign a message m $\in$ M, embodiments can first sample a one-time masking term r from a uniform random distribution and compute c:=H($\lfloor rA \rceil$, pk, m). The process can be restarted if rA−cE $\notin$ Good. The set Good (e.g., a predetermined set of intervals) is parameterized by a parameter $\beta$, which is determined by the norm of the noise term cE. More precisely, $\beta := \|cE\|_\infty$. The set Good is for every position $i \in [m]$ in a set of intervals. The amount of intervals can be determined by the amount of rounding borders caused by the rounding function $\lfloor \cdot \rceil : \mathbb{Z}_q \to \mathbb{Z}_p$. There can be p rounding borders that are positioned at the p multiples of q/p in $\mathbb{Z}_q$. Around each rounding border, the interval of length $[-\beta, \beta]$ is considered bad. All the remaining intervals can define the set Good. More precisely, as one example, $$\text{Good} := \left( \mathbb{Z}_q \setminus \bigcup_{i=0}^{p} \left[ -\beta + \frac{iq}{p}, \beta + \frac{iq}{p} \right] \right)^m.$$

The definition of Good can be tailored such that the rejection sampling in signature generation ensures that $\lfloor rA \rceil = \lfloor zA - cY \rceil$, i.e., both values $rA$ and $zA-cY$ round to the same value in $\mathbb{Z}_q$. Therefore, signatures generated by Sign verify with an overwhelming probability. Unlike previous FS-based signature schemes (e.g., [BG14, DLL+18]), where the norm of z is bounded, in embodiments, the norm of z may not be bounded and the verification does not need to check the norm of z.

D. Learning with Errors (LWE)

FIG. 2 illustrates an LWE problem for digital signatures involving a public key (A, Y) and a private key (S, E) according to embodiments of the present disclosure. The LWE problem is conjectured to be hard to solve. As such, the LWE problem can be used as the basis of a cryptosystem used to implement digital signatures according to some embodiments of the present disclosure. The LWE problem has been shown to be as hard to solve as several worst-case lattice problems, including, for example, the inhomogeneous short integer solution (ISIS) problem. The ISIS problem relates to finding the shortest vector in an n-dimensional lattice of points, satisfying the relationship $A \cdot x = y \mod q$. In this example, the vector y may be a message or a hash of the message, and the vector x may be a signature associated with the message.

FIG. 2 pictorially depicts the formula relating elements of the public key (A, Y) and the private key (S, E). This relationship allows digital signatures generated using the private key (S, E) (see Section III) to be verified using the public key (A, Y) (see Section IV). Further, FIG. 2 lists the "search" and "decision" versions of the LWE problem. The search and decision problems are equivalent when the parameter q is a prime.

III. LATTICE-BASED SIGNATURES USING UNIFORM DISTRIBUTIONS

As stated above, embodiments of the present disclosure can use uniform distributions to generate cryptographic material. This may include using uniform distributions to generate matrices used as cryptographic keys (including a verification matrix A and a secret matrix S), as well as random vectors r used to generate digital signatures. Generating these matrices and vectors from a uniform random distribution eliminates the possibility that a signature vector z (see Section III) leaks any information about the secret vector S, insuring the security of the private key. Consequently, the use of uniform distributions can require only a single rejection check during signature generation as opposed to the two rejection steps needed by some other techniques.

FIG. 3 illustrates three processes of key generation, signature verification, and signature verification. Box 300 corresponds to a cryptographic key generation process used to generate a public key PK (also referred to as (A, Y), due to the two matrices that make up the public key) and a private key SK (also referred to as (S, E), due to the two matrices that make up the private key). Box 310 shows a process used to generate a digital signature on a message µ using the public key (A, Y) and secret key (S, E). Box 320 shows a process for verifying digital signatures. In these processes, the secret matrix S and the random vector r are sampled from uniform random distributions, rather than Gaussian distributions. In some embodiments, S is sampled from a uniform distribution using a ring.

As stated above, Box 300 shows a method for generating the public key (PK or (A, Y)) and private key (SK or (S, E)). In step 301, a verification matrix A is generated by sampling from a uniform distribution bound by a modulus q, such that randomly sampled values are in the range [0, q−1], and A has dimensions n and m. In step 302, the secret matrix S is generated from the uniform distribution and has dimensions h and n, where h is less than or equal to n. The error matrix E is generated from a non-uniform distribution D (e.g., a Gaussian distribution or another peaked distribution, such as a Laplace distribution) and has dimensions h and m. In step 303, the public matrix Y is generated using the secret matrix S, the verification matrix A, the error matrix E, and the modulus q. In step 304, the public key is generated and comprises the verification matrix A and the public matrix Y. The private key is likewise generated and comprises the secret matrix S and the error matrix E. Cryptographic key generation is described in more detail in Section II.

Box 310 shows operations used to generate a digital signature on a message p using the public key (A, Y) and the secret key (S, E). In step 311, a random vector r is sampled from a uniform distribution. In step 312, a challenge vector c is determined using a hash function H operating on the message µ, a rounded product vector $\lfloor rA \rceil$ (as indicated by the brackets) modulus the modulus q. The rounded value may discard a specified number of least significant bits. At step 313, a verification vector v is generated using the formula $rA-cE$. Using the verification vector v, it is determined whether to reject the current formulation. Thus step 313 is considered a rejection step. The rejection step can ensure both correctness and security. The rejection step can ensure that the rounded product vector $\lfloor rA \rceil$ is the same as the rounded value $rA-cE$. If these two vectors are not the same, the method can restart at step 311, i.e., generating a new random vector r, generating a new challenge vector c, etc. At step 314, a signature vector z is generated using the formula $z=r+cS$. The digital signature can include both the challenge vector c and the signature vector z. The digital signature and the message µ can be sent to a receiving device (also referred to as a verifying device). Digital signature generation is described in more detail below.

Box 320 shows operations for digital signature verification. The verifying device can store the public key comprising the verification matrix A and the public matrix Y. In step 321, a verification vector v' is determined using the formula $v'=zA-cY$, which combines elements of the public key and the signature. A rounded verification vector w is determined by discarding a specified number of least significant bits. At step 322, a hash value corresponding to the message µ and the rounded verification vector w is generated and compared to the challenge vector c. Ideally, the result should equal the challenge vector c, because $v'=zA-cY=(r+cS)A-cY=rA+cSA-cY=rA-c(Y-SA)=rA-cE$, which equals rA when rounded, per step 313. Digital signature verification is described in more detail below.

Advantages include no sampling from special distributions (e.g., bounded distributions) during signing. Embodiments may also only use one rejection sampling (one checking point) during signing. No signature norm check may be needed in signature verification. Additionally, security relies on the injectivity of LWE, and may not need to utilize the forking lemma in the proof. Accordingly, embodiments can achieve security in the quantum random oracle model (QROM) and can achieve better parameters (e.g., lower number of expected repetitions to generate digital signatures, smaller key sizes, etc. Table 3 below provides some example parameters.

IV. DIGITAL SIGNATURE SCHEME

The example signature scheme in FIG. 3 is described in more detail.

A. Cryptographic Key Generation

Figure 4:
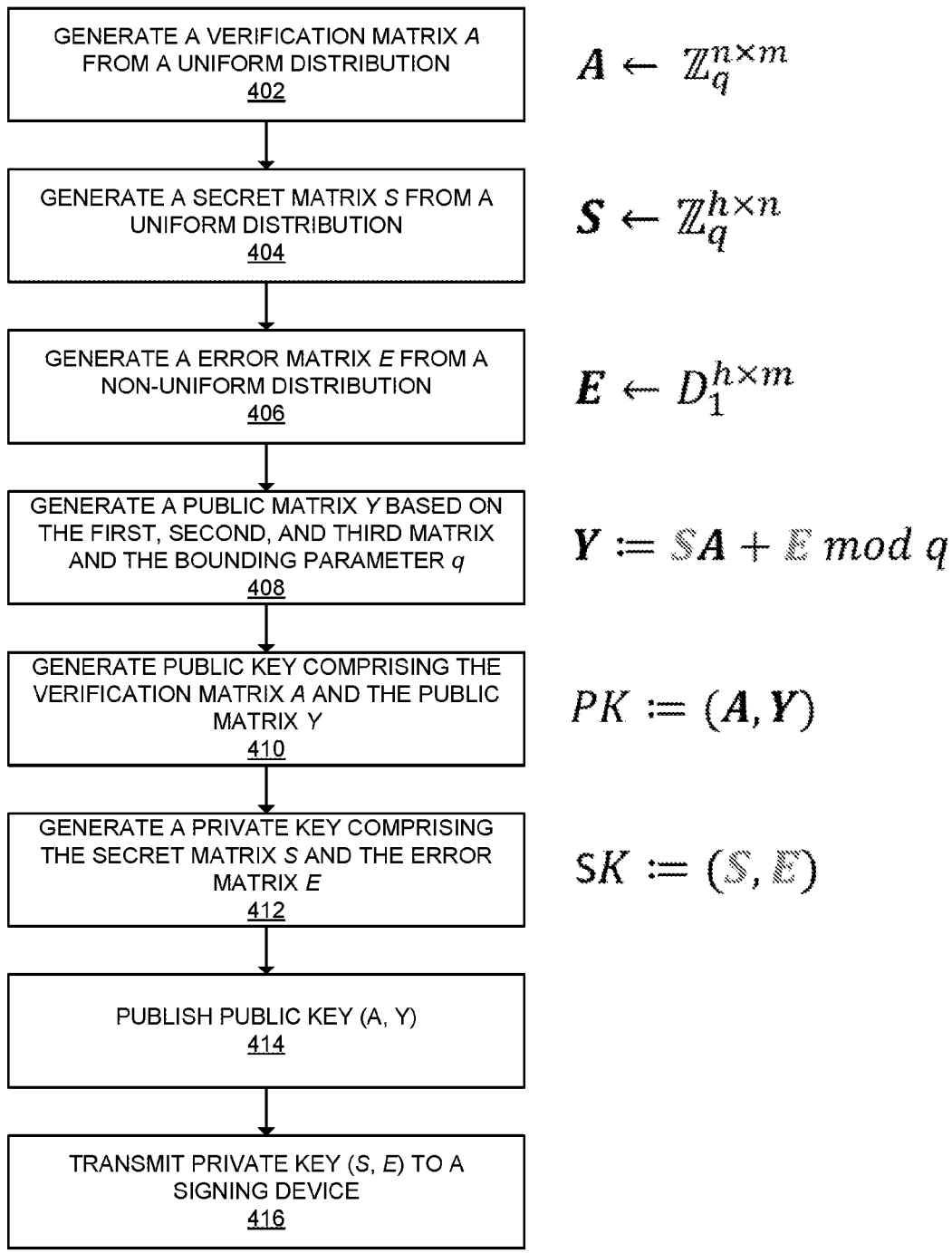
FIG. 4 shows a flowchart of an exemplary cryptographic key generation method according to some embodiments.

FIG. 4 shows a flowchart corresponding to an exemplary method of generating cryptographic keys according to some embodiments. These cryptographic keys comprise a public verification key and a private signing key. The signing key can be used to generate digital signatures, and the verification key can be used to verify digital signatures. These cryptographic keys comprise paired matrices, each comprising elements sampled from random distributions. These random distributions CAN include uniform random distributions and non-uniform random distributions. In some embodiments, the non-uniform distribution may comprise a Gaussian distribution, or another peaked distribution, such as a Laplace distribution or a hyperbolic distribution. The method of FIG. 4 may be executed by a generating device, such as the generating device 102 from FIG. 1.

At step 402, the generating device can generate a verification matrix A comprising a first plurality of elements, the first plurality of elements sampled from a uniform distribution. The verification matrix A may comprise one part of the public verification key, and may later be used by a verifying device to verify a digital signature. The uniform distribution may be bound by a modulus q, such that each element of the first plurality of elements is less than or equal to the modulus q. In some embodiments, randomly sampling from the uniform distribution produces an integer value in the range [0, q−1], i.e., each element of the first plurality of elements and each element of the second plurality of elements is an integer greater than or equal to 0 and less than or equal to q−1. A large value of q (e.g., greater than 1,000,000) may be preferable for security reasons. An even larger value of q (e.g., greater than $2^{20}$) may be more preferable. Performance tests have been performed with q values $2^{23}$, $2^{27}$, $2^{29}$, $2^{31}$, and $2^{45}$ (summarized in Section VII below). The uniform distribution may be implemented as a polynomial ring.

The verification matrix A may comprise n rows and m columns, for a total of n*m elements. While embodiments of the present disclosure can be practiced with different values of n and m, it may be preferable for m to be greater than n. As summarized in Section VII below, m may be approximately 2 to 4 times greater than n. Hence, the matrix A may comprise a "wide" matrix, with two to four times as many columns as rows.

To generate the verification matrix A, the generating device may randomly sample from the uniform distribution a total of n*m times, assigning each of the sampled values to an element of the first plurality of elements in the verification matrix A. As examples, the generating device can do this sequentially (e.g., row by row or column by column), randomly (e.g., by assigning a sampled value to a random unassigned element in the matrix), or using any other appropriate assignation method.

At step 404, the generating device can generate a secret matrix S comprising a second plurality of elements. The second plurality of elements can be sampled from the uniform distribution (i.e., the same uniform distribution used to generate the verification matrix A). As for the verification matrix A, the uniform distribution can be bound by the modulus q, such that each element of the second plurality of elements is less than or equal to the modulus q. The secret matrix S may comprise h rows and n columns, for a total of h*n elements. In some embodiments, h is less than or equal to n. The secret matrix S may comprise part of the private signing key, later used by a signing device to generate digital signatures.

The secret matrix S may be generated in substantially the same manner as the verification matrix A, i.e., by repeatedly and randomly sampling the uniform distribution until all elements of the secret matrix S have been assigned. In other lattice-based signature systems, the secret matrix S may be sampled from a Gaussian (i.e., non-uniform distribution). Sampling from a uniform distribution, rather than a Gaussian distribution, provides an advantage during the digital signature generation process because it eliminates the need for a security check on a signature vector z (see subsection B).

At step 406, the generating device can generate an error matrix E from a non-uniform distribution. In some embodiments, the non-uniform distribution comprises a Gaussian distribution. The non-uniform distribution can also comprise another distribution, such as a Laplace distribution or a hyperbolic distribution. The error matrix E may comprise h rows and m columns, for a total of h*m elements. The error matrix E and the secret matrix S comprise the private signing key and may be later used by a signing device during the digital signature generation process. The error matrix E may be generated by repeatedly sampling the non-uniform distribution until all elements of the error matrix E are assigned. Unlike the uniform distribution, the non-uniform distribution is not bound by the modulus q.

At step 408, the generating device can generate a public matrix Y based on a combination of the verification matrix A, the secret matrix S, the error matrix E, and the modulus q. In some embodiments, the public matrix Y is determined by the formula Y=SA+E mod q. The public matrix Y can comprise an h*m matrix like the error matrix E. The public matrix Y along with the verification matrix A may comprise the public verification key. Determining either S or E from the public key (A, Y) is equivalent to the "learning with errors" search problem, a problem that is computationally hard even for sufficiently powerful quantum computers. Hence an attacker cannot determine either part of the private key (S, E) even if the attacker knows the public key (A, Y).

At step 410, the generating device can generate a public key comprising the verification matrix A and the public matrix Y. The generating device can do this by creating a data packet or other suitable data structure comprising these two matrices. Likewise, at step 412, the generating device can generate a private key comprising the secret matrix S and the error matrix E.

At step 414, the generating device can publish the public verification key (A, Y) by making it freely available to all devices on a network (e.g., a network such as the Internet), including signing devices, verifying devices, and any other devices on the network (such as devices associated with attackers). Alternatively, the generating device can distribute the public key in a more limited manner, e.g., by transmitting the public key directly to a verifying device and a signing device.

At step 416, the generating device can transmit the private key (S, E) to a signing device using a secure transfer protocol. For example, the generating device and the signing device may perform a key exchange (such as a post-quantum secure key exchange), then the generating device may encrypt the private key and transmit the encrypted private key to the signing device, such that the signing device can decrypt the encrypted private key. In some embodiments, the generating device may be the only signing device in the network, hence, transmitting the private key to other signing devices is an optional step.

B. Digital Signature Generation

Figure 5:
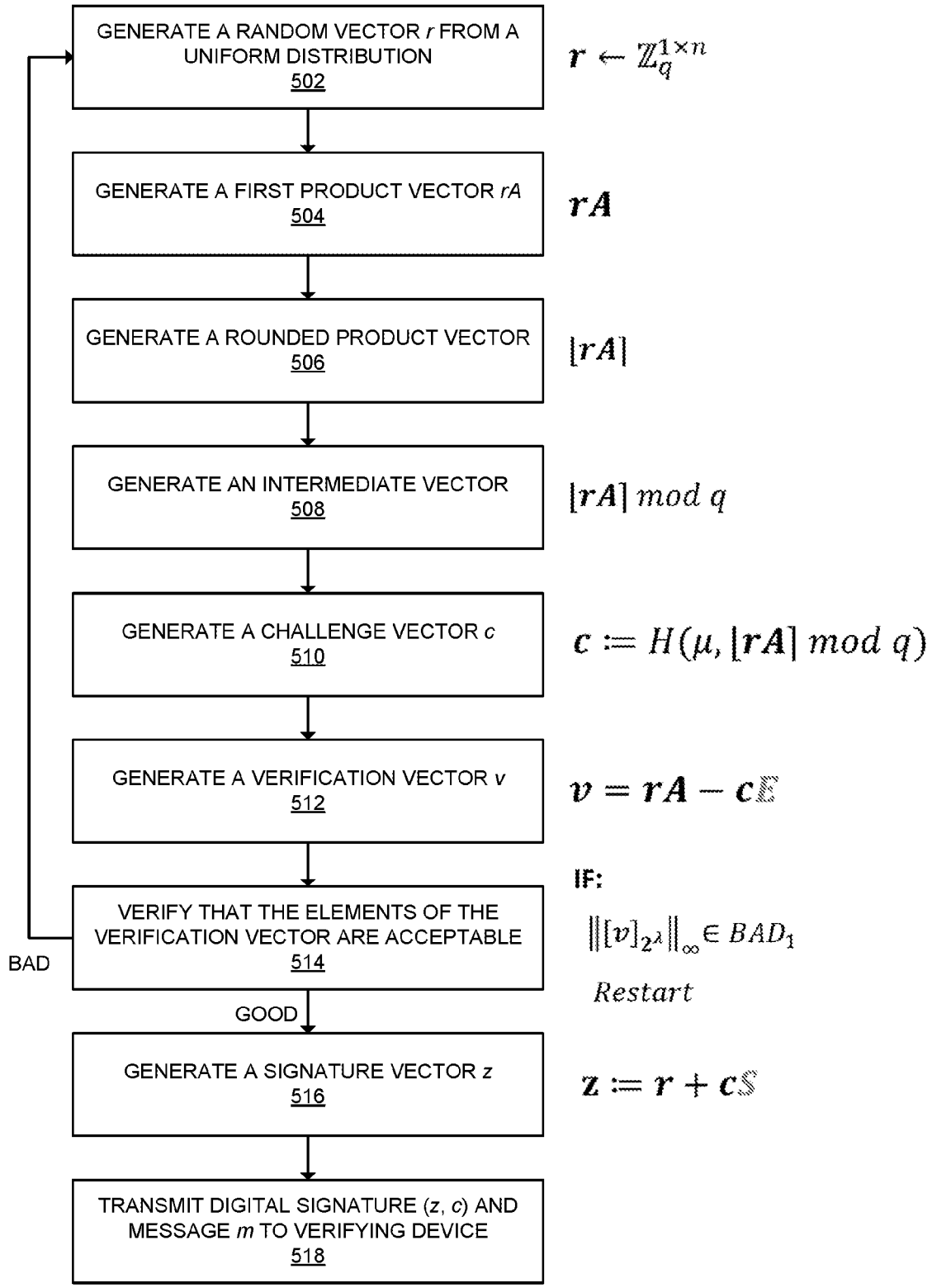
FIG. 5 shows a flowchart of an exemplary digital signature generation method according to some embodiments.

FIG. 5 shows a method for generating digital signatures according to some embodiments of the present disclosure. The method of FIG. 5 can be executed by a signing device (such as signing device 104 from FIG. 1). The signing device possesses a private signing key generated by a generating device (such as generating device 102 from FIG. 1), and uses the private signing key, along with a public verification key to generate digital signatures. In some embodiments, the generating device and the signing device may comprise a single device, e.g., a single computer system. In these embodiments, the computer system may both generate the cryptographic keys, and generate a digital signature for a message m using the cryptographic keys.

At step 502, the signing device can generate a random vector r by sampling from a uniform distribution. This uniform distribution can be the same uniform distribution used to generate the cryptographic keys (e.g., as described above), and may be bound by the same modulus q. The random vector r may comprise a 1 by n vector, and may be generated by repeatedly and randomly sampling the uniform distribution n times.

At step 504, the signing device can generate a product vector rA by calculating the product of the random vector r and the verification matrix A. The signing device may accomplish this using matrix multiplication, and the resulting first product vector rA may comprise a 1 by m vector.

At step 506, the signing device can generate a rounded product vector $\lfloor rA \rceil$ by discarding one or more least significant bits from each element of the product vector rA. Rounding the product vector rA improves the probability that a verifying device will be able to reproduce a challenge vector c and successfully verify the digital signature, rounding the product vector rA also helps to obscure the value of the random vector r.

At step 508, the signing device can calculate an intermediate vector $\lfloor rA \rceil$ mod q by applying the modulus operator to each element of the rounded product vector $\lfloor rA \rceil$. This ensures that each element of the intermediate vector is within the range defined by the modulus q.

At step 510, the signing device can generate a challenge vector c by hashing the message m and the intermediate vector $\lfloor rA \rceil$ mod q (i.e., c=H(m, $\lfloor rA \rceil$ mod q)). During signature verification (see Section IV), the verifying device can attempt to generate another challenge vector, using the same message and the same hash function H. Provided that the hash function H is collision resistant, a device has a vanishingly small probability of reproducing the challenge vector c without successfully reproducing the intermediate vector, or a vector equal to the intermediate vector.

At step 512, the signing device can calculate a verification vector v based on the first product vector rA, the challenge vector c, and the error matrix E. In some embodiments, the verification vector v is calculated using the formula v=rA−cE. The verification vector v can be subsequently used in a correctness check at step 514. Effectively, this check determines if a verifying device is able to reproduce the challenge vector during signature verification.

At step 514, the signing device can verify that a plurality of elements of the verification vector v are within a predetermined interval of values (e.g., Good values as descried above). The predetermined interval of values may be determined based on a parameter β, also referred to as a bounding parameter. The parameter β may be based on the "noise term" i.e., the vector product cE, such that the parameter β is greater than or equal to the infinity norm of the product of the challenge vector c and the error matrix E with a specified probability. In one embodiment, the specified probability comprises a probability greater than 99.99%. In another embodiment, the specified probability comprises a probability greater than $1-2^{-128}$%. The specified probability and the parameter β can influence the security of the cryptosystem, as well as the probability of successfully generating a signature. The predetermined interval may be given by the following expression $$\left(\mathbb{Z}_q \setminus \bigcup_{i=0}^{p}\left[-\beta+\frac{iq}{p}, \beta+\frac{iq}{p}\right]\right)^m,$$

where p is the number of rounding boarders caused by the rounding function (applied, for example, at step 506).

Effectively, the predetermined interval of values guarantees that generated signatures can be verified successfully. If the plurality of elements of the verification vector v are within the predetermined interval of values, a rounded verification vector $\lfloor v' \rceil$, generated during signature verification (see Section IV), may equal the rounded product vector $\lfloor rA \rceil$. As a result, the verifying device can reproduce the challenge vector c and verify the digital signature. If the values are not within the predetermined interval, the two vectors $\lfloor v' \rceil$ and $\lfloor rA \rceil$ will be unequal; and the verifying device will be unable to reproduce the challenge vector c, and consequently cannot verify the digital signature. If the elements of the verification vector v are not within the predetermined interval of values, the signing device can return to step 502 and generates a new random vector r. If the elements of the verification vector are within the predetermined interval of values, the method proceeds to step 516. Steps 502 to 514 may be repeated until the plurality of elements of the verification vector v are within the predetermined interval of values.

In some embodiments, the signing device can verify the plurality of elements of the verification vector v are within a predetermined interval of values by first determining a plurality of least significant bits of the verification vector v (e.g., the least significant bits corresponding to each element of the verification vector v). Subsequently, the signing device can calculate an infinity norm of the plurality of least significant bits, then verify that the infinity norm is within the predetermined interval of values: $\|[v]_{2^\lambda}\|_\infty \in GOOD_1$, where $GOOD_1$ comprises the predetermined interval of values, and $[v]_{2^\lambda}$ is the λ least significant bits of verification vector v. Typically, the least significant digits or bits of a number influence the rounding of that number. Thus evaluating the least significant bits of verification vector v can be an efficient method of determining whether the digital signature can be verified during signature verification.

At step 516, after verifying the verification vector v, the signing device can generate a signature vector z. In some embodiments, the signature vector is generated according to the formula z=r+cS. That is, the signature vector z equals the sum of the random vector r and the product of the challenge vector c and the secret matrix S (a component of the private signing key). Notably, because the secret matrix S and the random vector r are sampled from the same random distribution, the signature vector z does not leak any information about the secret matrix S. This is in contrast to some other lattice-based signature schemes, in which the random vector r and the secret matrix S are sampled from Gaussian distributions. In these other schemes, the signature vector z can potentially leak information about the (secret) secret matrix S, which is a security risk for the signature system. As such, some other systems subsequently perform a rejection test, similar to step 314, on the signature vector z. If the signature vector z fails the test (i.e., leaks information about the secret matrix S), a new random vector r is generated and the digital signature process is repeated. However, in embodiments of the disclosure, because r and S are sampled from the same distribution, z does not leak any information about S. As a consequence, the rejection test used in other schemes is unnecessary.

This results in an improvement to the speed of digital signature generation. A reduction in the number of rejection tests naturally reduces the average number of repetitions needed to produce a valid digital signature. In some other systems, it may take up to 10 tries to produce a valid signature. In embodiments of the present disclosure, as summarized in Section VII, the worst case expected number of repetitions was 6.72, while the best case was 1.52, both of which are less than the expected 10 repetitions in conventional systems.

In some embodiments, the digital signature comprises both the challenge vector c and the signature vector z. At step 518, the signing device can send the digital signature (c, z) and the message m to a verifying device. Subsequently, the verifying device can evaluate the message m and verify the digital signature (c, z)

C. Digital Signature Verification

Figure 6:
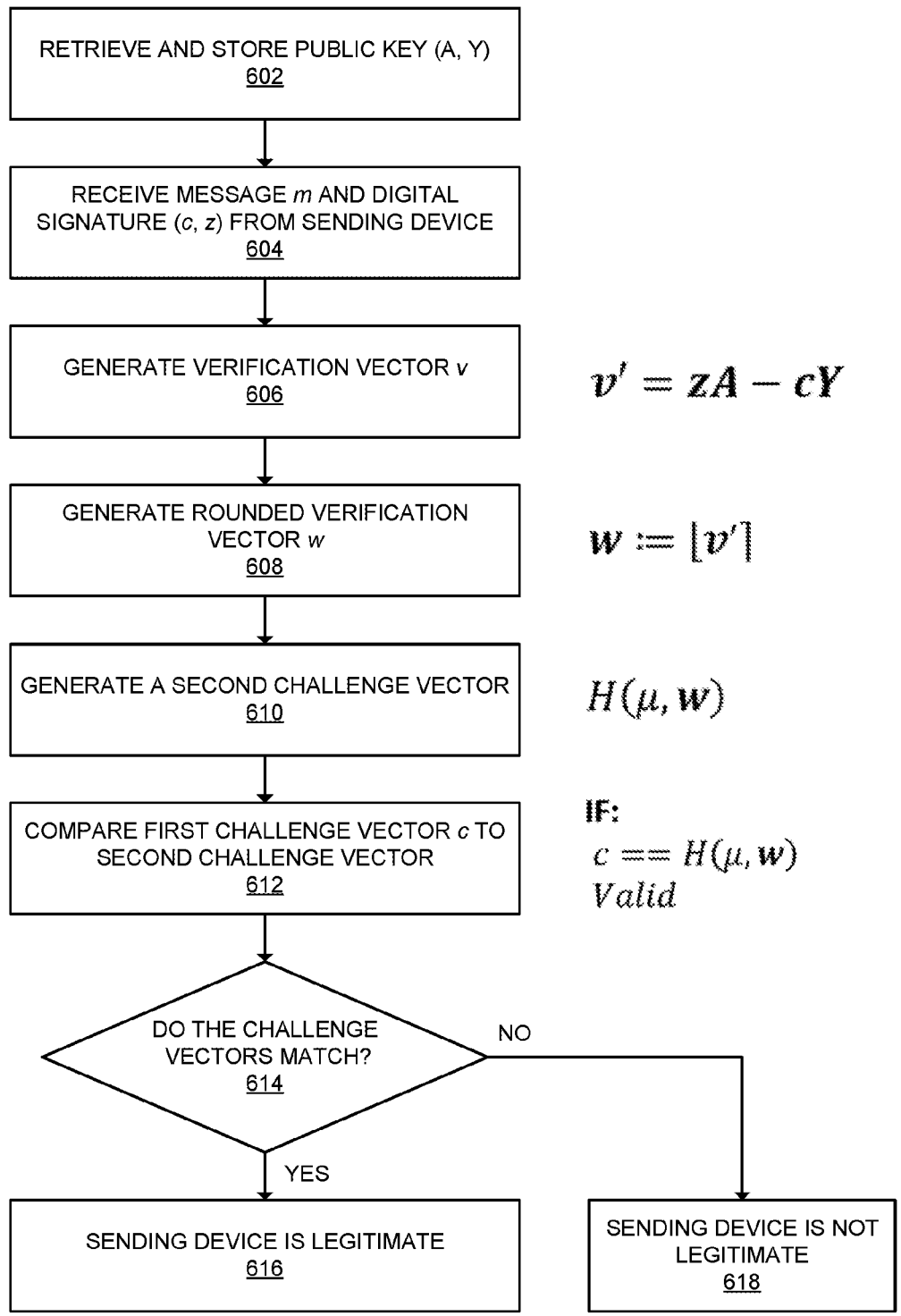
FIG. 6 shows a flowchart of an exemplary digital signature verification method according to some embodiments.

FIG. 6 shows a method of verifying a digital signature according to some embodiments of the present disclosure.

At step 602, the verifying device can store a public key comprising a verification matrix A and a public matrix Y. The verifying device may first receive the public key from a generating device (such as generating device 102 from FIG. 1). Alternatively, the verifying device may retrieve the public key from some publicly accessible source, such as a remote server computer configured to host the public key.

At step 604, the verifying device can receive a message m and a digital signature including a signature vector z and a first challenge vector c from a signing device. The message m can comprise any data that can be digitally transmitted. Particularly, the message m may comprise data for which the source of the data (i.e., the signing device) needs to be verified. For example, the message m may comprise an authorization response message indicating an authorization status of an interaction (e.g., a transaction) between the verifying device and a user device or a user. The verifying device or its operator may want to verify that the message m originated from a legitimate authorization computer, in order to verify that the transaction has actually been authorized. The verifying device can use the message m, signature vector z, and first challenge vector c to perform signature verification.

At step 606, the verifying device can generate a first verification vector v' based on the verification matrix A (retrieved from the public key), the public matrix Y (also retrieved from the public key), the signature vector z, and the first challenge vector c. In some embodiments, the verifying device can generate the first verification vector v' based on the formula v'=zA−cY. Assuming that z=r+cS and Y=SA+E, v=(r+cS)A−c(SA+E)=rA−cE. Thus the first verification vector v' generated by the verifying device may equal the verification vector v generated by the signing device during digital signature generation.

At step 608, the verifying device can generate a rounded verification vector w by discarding one or more least significant bits from the verification vector v', similar to how the generating device generated a rounded product vector $\lfloor rA \rfloor$ during signature verification (see step 506, FIG. 5). Provided that the signature is valid, and the verification vector v passed the rejection test during signature generation (see step 512, FIG. 5), the rounded verification vector w should equal the rounded product vector $\lfloor rA \rfloor$.

At step 610, the verifying device can generate a second challenge vector H(m, w) by hashing the message m and the rounded verification vector w, similar to the method used to generate the challenge vector c by the generating device. Provided the same hash function H is used during signature generation and signature verification and provided the rounded verification vector w is equivalent to the rounded product vector $\lfloor rA \rfloor$, the second challenge vector H(m, w) should equal the challenge vector c included in the digital signature.

At step 612, the verifying device can compare the first challenge vector c to the second challenge vector. The verifying device can perform this comparison by comparing each element of the first challenge vector c to the corresponding element of the second challenge vector. At step 614, the verifying device can determine if the challenge vectors match, that is, if each element of the second challenge vector is equal to a corresponding element of the first challenge vector c.

At step 616, the verifying device can verify the sending device in response to the first challenge vector c matching the second challenge vector. Alternatively, if the challenge vectors do not match, at step 618, the verifying device can determine that the sending device, message m, or signature (c, z), or any combination thereof are not legitimate.

V. EXEMPLARY APPLICATION

Figure 7:
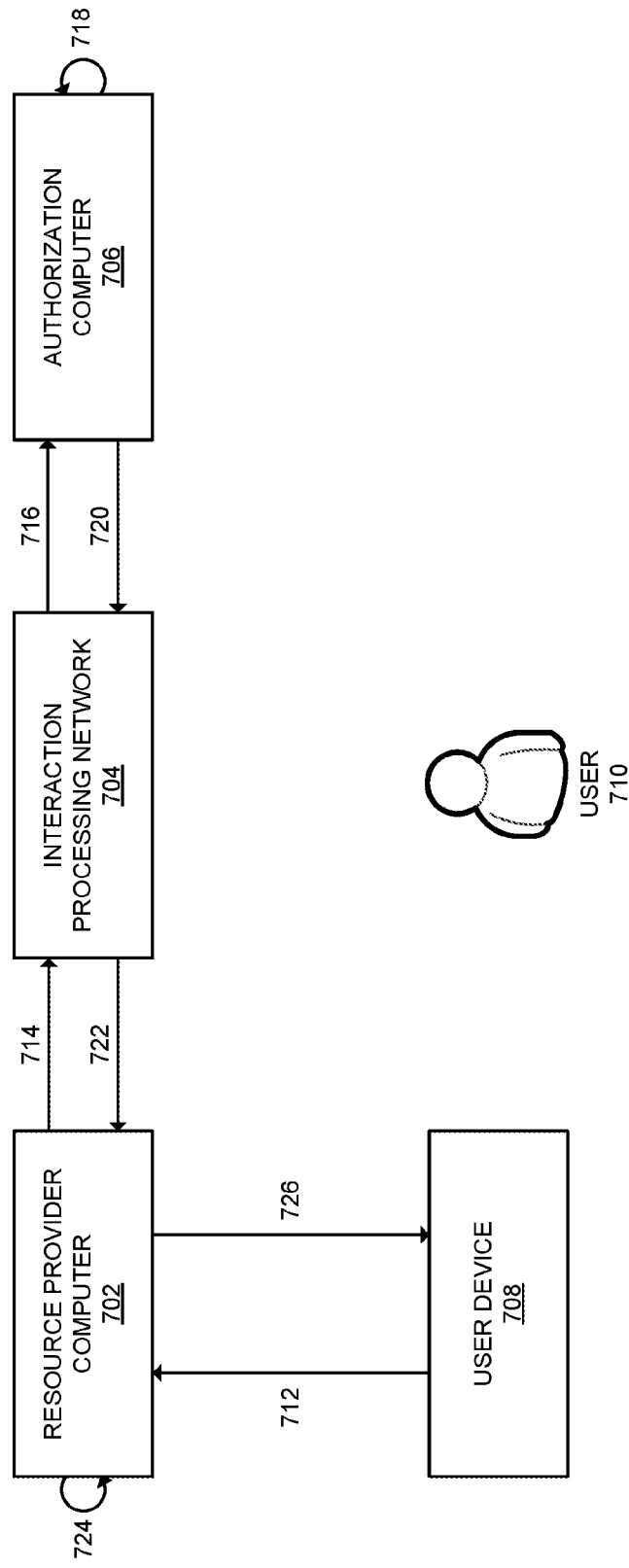
FIG. 7 shows a flowchart of an exemplary application of digital signatures according to some embodiments.

FIG. 7 shows a system block diagram of an exemplary application of methods and systems described in the present disclosure. In FIG. 7, a user 710 of user device 708 wishes to procure a resource from a resource provider operating a resource provider computer 702. This could comprise, for example, the user 710 using user device 708 to purchase a good or service from the resource provider, via resource provider computer 702. For example, resource provider computer 702 could comprise a web server associated with an e-commerce retailer, or a web server associated with a digital streaming service. User device 708 could comprise a personal computer, tablet, PDA, smartphone, etc., that user 710 uses to interface with the resource provider computer 702 (e.g., via a web-browser).

At step 712, after selecting the resource the user 710 wants to acquire (e.g., the good or service the user wants to purchase), the user device 708 may provide a payment credential (such as a payment account number (PAN)) to the resource provider computer 702, along with any other relevant information (e.g., a credit card expiration date, verification value (CVV or CVV2), zip code, billing address, etc.). The payment credential may be associated with a payment account associated with the user 710, such as a checking account or a line of credit. This account or line of credit may be managed or provided by an issuing bank (e.g., a bank that issued a credit or debit card associated with the payment account number). The issuing bank may authorize transactions made using the payment account number, and may operate an authorization computer 706 for this purpose.

At step 714 the resource provider computer 702 can generate an authorization request message comprising the payment credential and any other relevant information (e.g., as described above). The authorization request message may indicate that the resource provider computer 702 wants the transaction between the resource provider and the user 710 authorized so that the resource provider computer 702 can complete the transaction. The resource provider computer 702 may transmit the authorization request message to an interaction processing network 704. This interaction processing network 704 may comprise a payment processing network, which may include data processing subsystems, networks, and operations used to support and deliver authorization services, exception file services, and clearing and settlement services. An exemplary payment processing network may include VisaNet™. Networks that include VisaNet™. are able to process credit card transactions, debit card transactions, and other types of commercial transactions. VisaNet™, in particular, includes integrated payments systems that process authorization requests and a Base II system which performs clearing and settlement services. The interaction processing network 704 may evaluate the authorization request message and identify an issuing bank (and authorization computer 706) associated with the authorization request message, then route the authorization request message to the authorization computer 706.

At step 716, the interaction processing network 704 may transmit the authorization request message to the authorization computer 706. Subsequently, the authorization computer 706 may evaluate the authorization request message at step 718. This evaluation may comprise evaluating the information included in the authorization request message. For example the authorization computer 706 may evaluate the payment credential to identify an account associated with the payment credential. Additionally the authorization computer 706 may evaluate the authorization request message in order to identify if the payment credential is being used fraudulently (e.g., was stolen from user 710). For example, the authorization computer 706 may evaluate the geographic source of the authorization request message and compare it to previous authorization request messages, to determine if the user 710 is exhibiting uncharacteristic purchasing patterns. After evaluating the authorization request message, the authorization computer 706 may generate an authorization response message and transmit the authorization response message to the resource provider computer 702 via interaction processing network 704 at step 720.

The authorization response message can indicate the authorization status of the interaction between the resource provider computer 702 and the user device 708 or user 710 (i.e., whether or not the interaction has been authorized). Further, the authorization response message can include a digital signature corresponding to the authorization computer 706. This digital signature can be generated using the lattice-based methods described in this disclosure (e.g., as described with reference to FIG. 5), and can be used by resource provider computer 702 to verify that the authorization response message was generated by a legitimate authorization computer 706. Without using a digital signature scheme, a fraudster could conceivably generate fake authorization response messages in order to convince the resource provider to complete transactions that have not been authorized.

The interaction processing network 704 can forward the authorization response message to the resource provider computer 702 at step 722. Subsequently, the resource provider computer 724 can evaluate the authorization response message. This may include, for example, determining whether the transaction has been approved or denied. Additionally, the interaction processing network 704 can verify a digital signature included in the authorization response message using the methods described in this disclosure (e.g., as described with reference to FIG. 6). This verification process enables the resource provider computer 702 to determine whether the authorization resource message was actually generated by authorization computer 706 and not a fraudster. The resource provider computer 702 can use a public key associated with the authorization computer 706 to perform the verification process.

Subsequently, at step 726, the resource provider computer 702 can provide the desired good or service to user 710, via, for example, user device 708. For example, the resource provider computer 702 could transmit a file (such as a digital music file) to the user device 708. At a later time, a clearing and settlement process can be completed between an issuing bank associated with the authorization computer, and an acquiring bank associated with the resource provider.

VI. SECURITY ANALYSIS

In Theorem 4.1 below, we prove that our signature scheme is EU-CMA (existential unforgeable under chosen message attack) in the random oracle model (ROM).

Theorem 4.1. Let LWE be $(t_{LWE}, \varepsilon_{LWE})$-secure, ABDD be $(t_{ABDD}, \varepsilon_{ABDD})$-secure and $H_\infty(\lfloor rA \rceil \| A) \geq \xi$. Then the digital signature scheme according to embodiments (e.g., table 1) is $(t_A, \varepsilon_A, q_S, q_H)$-secure in the programmable random oracle model, where $t_A \approx t_{LWE} + t_{ABDD}$, $\varepsilon_A \leq \varepsilon_{LWE} + q_H \varepsilon_{ABDD} + q_H 2^\xi$, and $q_H \geq q_S$.

Proof. On a high level, this is proven in two hybrids. During the first hybrid, the programmability of the random oracle to respond to signature queries without knowing the secret key is used. This step of simulating the signatures without knowing the secret key relies on the rejection sampling condition.

TABLE 1

Example signature scheme

| $(sk, pk) \stackrel{\$}{\leftarrow} KGen(1^k)$: | $\sigma \stackrel{\$}{\leftarrow} Sign(sk, m)$: | $\{0, 1\} \stackrel{\$}{\leftarrow} Verify(pk, \sigma, \mu)$: |
|---|---|---|
| $s \stackrel{\$}{\leftarrow} R_q, e \stackrel{\$}{\leftarrow} D^m$, | Repeat until | Parse $\sigma = (z, c)$ |
| $A \stackrel{\$}{\leftarrow} R_q^m$ | $rA - ce \in Good$ | if $c = H(\lfloor zA - c\mathbf{y} \rceil, pk, m)$ |
| $y := sA + e(mod\ q)$ | $r \stackrel{\$}{\leftarrow} R_q$, | then Return 1 |
| $sk := s, pk := (A, y)$ | $c := H(\lfloor rA \rceil, pk, m)$ | else Return 0 |
| | $z := r + cs\ (mod\ q)$ | |
| Return (pk, sk) | Return $\sigma := (z, c)$ | |

During the second hybrid, the public key of a signature scheme according to embodiments is replaced with uniform randomness. In this hybrid, there is no secret key that allows for messages to be signed. Further, it is infeasible for an adversary to forge signature, provided the adversary cannot program the random oracle.

The following defines the two hybrids and shows that: 1) By a statistical argument, simulated signatures are identically distributed to signatures created by the signing algorithm with access to the secret key, i.e., every algorithm has the same advantage in the EUF-CMA game and hybrid 1. 2) there is no algorithm that has a different advantage in hybrid 1 and hybrid 2 unless it implicitly breaks the LWE assumption. 3) There is no algorithm that can forge a signature in hybrid 2 unless it implicitly breaks the ABDD assumption.

Summing up, this proves the theorem statement. The detailed description of the hybrids and the EUF-CMA game are depicted in Table 2.

rejects if $zA-cY \notin$ Good and finally programs the random oracle H on point $(\lfloor zA-cy \rceil, (A, Y), m)$ to be equal to c. the following shows that signatures (z, c) have the same distribution.

In the EUF-CMA game, $rA-cE=zA-cY$, hence the rejection condition is identical in both games. By the definition of Good, which is also required by correctness, $\lfloor rA \rceil = \lfloor zA-cY \rceil$ holds.

TABLE 2

EUF-CMA security game and hybrids to prove Theorem 4.1.

| EUF-CMA Game: | Hybrid 1: | Hybrid 2: |
|---|---|---|
| $s \xleftarrow{\$} R_q,$ | $s \xleftarrow{\$} R_q,$ | $s \xleftarrow{\$} R_q,$ |
| $e \xleftarrow{\$} D^m,$ | $e \xleftarrow{\$} D^m,$ | $e \xleftarrow{\$} D^m,$ |
| $A \xleftarrow{\$} R_q^m$ | $A \xleftarrow{\$} R_q^m$ | $A \xleftarrow{\$} R_q^m$ |
| y := sA + e(mod q) | y := sA + e(mod q) | $y \xleftarrow{\$} R_q^m$ |
| $(m^*, \sigma^*) \xleftarrow{\$} A^{O_H; Sign(s,\cdot)}(A, y)$ | $(m^*, \sigma^*) \xleftarrow{\$} A^{O_H; Sign(\cdot)}(A, y)$ | $(m^*, \sigma^*) \xleftarrow{\$} A^{O_H; Sign(\cdot)}(A, y)$ |
| $\sigma \xleftarrow{\$}$ Sign(s, m): | $\sigma \xleftarrow{\$}$ Sign(m): | $\sigma \xleftarrow{\$}$ Sign(m) |
| Repeat until rA − ce ∈ Good | Repeat until zA − cy ∈ Good | Repeat until zA − cy ∈ Good |
| $r \xleftarrow{\$} R_q$ | $z \xleftarrow{\$} R_q, c \xleftarrow{\$} B^h$ | $z \xleftarrow{\$} R_q, c \xleftarrow{\$} B^h$ |
| c := H($\lfloor rA \rceil$, (A, y), m) <br> z := r + cs(mod q) <br> Return σ := (z, c) <br> $O_H$(a): | H($\lfloor zA-cy \rceil$, (A, y), m) := c <br> Return σ := (z, c) <br> $O_H$(a): | H($\lfloor zA-cy \rceil$, (A, y), m) := c <br> Return σ: (z, c) <br> $O_H$(a): |
| If H(a) is not defined | If H(a) is not defined | If H(a) is not defined |
| then $H(a) \xleftarrow{\$} B^h$ | then $H(a) \xleftarrow{\$} B^h$ | then H(a)$B^h$ |
| Return H(a) | Return H(a) | Return H(a) |

The formal argument starts by showing that any adversary that is successful in the EUF-CMA game is also successful in hybrid 1.

Lemma 4.2. Let there be an algorithm that $(t, \Sigma, q_S, q_H)$-breaks the EUF-CMA security. Then, there is also an algorithm that $(t', \varepsilon', q_S', q_H')$-forges a signature in hybrid 1 for $t' \approx t$, $\varepsilon' = \varepsilon - q_H q^n$, $q'_S = q_S$, and $q'_H = q_H$.

Proof. The difference between the EUF-CMA game and hybrid 1 is how signing queries are answered. In the EUF-CMA game, one samples first $$r \xleftarrow{\$} R_q,$$

computes c=H($\lfloor rA \rceil$, pk, m), rejects if rA−cE $\notin$ Good and then compute z=r+cs. In hybrid 1, one samples first $$z \xleftarrow{\$} R_q, c \xleftarrow{\$} B^h,$$

Next, assume that the random oracle is not defined on point $(\lfloor zA-cy \rceil, (A, Y), m)$ yet. This is the case unless the adversary has queried the random oracle on this point already, which would require him to guess rA correctly. Since the min-entropy of $\lfloor rA \rceil$ give A is at least $\xi$, the probability of the adversary to make this query is at most $q_H 2^\xi$. If this is not the case, in game EUF-CMA as well as in hybrid 1, c is uniformly conditioned on c=H($\lfloor rA \rceil$, pk, m). In particular, in hybrid 1, programming the random oracle, i.e., c:=H($\lfloor rA \rceil$, pk, m), does not change the distribution of c compared to the EUF-CMA game.

It is left to show that z has the same distribution. In game EUF-CMA, z=r+cs, where $$r \xleftarrow{\$} R_q.$$

In hybrid 1, $$z \xleftarrow{\$} R_q.$$

In hybrid 1, define $r=z-cs$. Hence, r is uniform and z is determined by r, s, and c as in EUF-CMA, which concludes the proof of this lemma.

Lemma 4.3. Let there be an algorithm that $(t, \varepsilon, q_S, q_H)$-forges a signature in hybrid 1 and LWE be $(t_{LWE}, \varepsilon_{LWE})$-secure. Then, there is also an algorithm that $(t', \varepsilon', q_S', q_H')$-forges a signature in hybrid 2 for $t' \approx t+t_{LWE}$, $\varepsilon' \geq \varepsilon - \varepsilon_{LWE}$, $q'_S = q_S$, and $q'_H = q_H$.

Proof. The lemma follows from a reduction to LWE. The difference between hybrid 1 and hybrid 2 is the distribution of the public key (A, Y). In hybrid 1, it is LWE distributed, while uniform in hybrid 2. If there is an algorithm that E forges in hybrid 1 and $\varepsilon'$ forges in hybrid 2, then LWE can be told apart from uniform with advantage $|\varepsilon - \varepsilon'|$, i.e., $\varepsilon_{LWE} \geq |\varepsilon - \varepsilon'|$.

Lemma 4.4. Let there be an algorithm that $(t, \varepsilon, q_S, q_H)$-forges a signature in hybrid 2. Then, there is also an algorithm that $(t_{ABDD}, \varepsilon_{ABDD})$-solves ABDD $$\text{for } t_{ABDD} \approx t, \varepsilon_{ABDD} \geq \frac{1}{q_H}\varepsilon.$$

Proof. The lemma is proven by embedding an ABDD challenge in hybrid 2 such that if an algorithm forges successfully, it solves the ABDD problem. Use the ABDD challenge A, Y as a public key in hybrid 2. Guess a random oracle query for point (w, (A, y), m*) to request a challenge string c for query w*=w from the ABDD challenger. Program the random oracle by setting H(w, (A, y), m*)=c. With probability $$\frac{1}{q_H},$$

the forgery will be for this c and message m*. Then a valid signature (z, c*) contains a valid ABDD solution z.

For applicability of Theorem 4.1, it should be shown that $H_\infty(\lfloor rA \rceil | A) \geq \xi$. Technically, it would be sufficient to show that it is hard for any efficient adversary to computer $\lfloor rA \rceil$ given A. This would be sufficient, since it only needs to be hard for an efficient adversary to guess the points where the random oracle is going to be programmed at. Using computational intractability here would be overly pessimistic.

Instead, an approach similar to Bai and Galbraith [BG14, Lemma 3] using the Gaussian heuristic was used. In this case it is possible to exploit that r is chosen uniformly at random.

Lemma 4.5. For any $A \in R_q^m$ with an invertible $A' \in R_q$, $$H_\infty(\lfloor rA \rceil | A) \geq n \log(q - |B_1|),$$

where $\lfloor rA \rceil \in Z_{q-|B_1|}^m$

Proof. Since A' is invertible, $$H_\infty(\lfloor rA \rceil | A) = H_\infty(\lfloor rA' \rceil | A) = H_\infty(r)$$

The rounding functions causes a loss of $\log(q-B_1)$, entropy at each of the n entries.

VII. PARAMETERS

This section provides concrete parameters corresponding to digital signatures according to some embodiments of the present disclosure in two settings. In the first setting, the parameters are set so that the adaptive bounded distance decoding problem (ABDD, cf. Definition 3.2) is hard even for a computationally unbounded adversary, under the Gaussian heuristic. The public keys in this setting are lossy, so that the scheme has a tight security proof in the quantum random oracle model following [KLS18] In the second setting, the parameters are set so that the ABDD problem is computationally hard. This setting results in digital signature schemes with smaller public keys and a lower number of repetitions.

A. Parameter Estimation for the Lossy Mode

This subsection first covers the formula for the lossy mode assuming the digital signature scheme is defined over Z, then covers concrete parameter estimation assuming the digital signature scheme is instantiated over a module over $R:= \mathbb{Z}[x]/(x^d+1)$, where d is a power-of-two.

The formula for the lossy mode. Let q be the bigger modulus, p be the smaller modulus after rounding. Let h, n, m∈ $\mathbb{Z}$ be dimensions, where h≤n. Let B denote the space of each entry of the challenge vector c, i.e., $c \in B^{1 \times n}$. Let $B_1$ denote the space of each entry of the rounding error, where $$|B_1| \leq \frac{q}{p} + 1.$$

Theorem 5.1. Assuming Gaussian heuristic, if $q^{n-m}|B_1|^m$ is a negligible function, then for all but negligibly many $A \in \mathbb{Z}_q^{n \times m}$ and $Y \in \mathbb{Z}_q^{h \times m}$, the following statement holds. For all $v \in \mathbb{Z}_q^{1 \times m}$, $$\Pr_{c \in B^{1 \times h}}\left[\begin{array}{c} \exists z \in \mathbb{Z}_q^{1 \times n}, \\ E' \in B_1^{1 \times m} \text{ such that } zA - cY = v + E' \pmod{q} \end{array}\right] \leq negl(\kappa)$$

TABLE 3

Parameters of a digital signature scheme according to embodiments in the lossy mode. Parameter sets 1 and 2 follow the q, d, l, η, w, β chosen in [DKL + 18] and [KLS18], then derive m, expected repetitions, LWE hardness and so on. Parameter sets 3 to 6 use different parameters. Parameter sets 5 and 6 are designed to be comparable with the security levels of qTESLA-p-I & qTESLA-p-III [ABB + 19] and Dilithium-QROM "recommended" and "very high" in [KLS18].

| Parameters | 1 | 2 | 3 | 4 | 5 | 6 |
|---|---|---|---|---|---|---|
| $\log_2 q$ | 23 | 45 | 31 | 27 | 27 | 29 |
| d | 256 | 512 | 256 | 1024 | 1024 | 512 |
| l | 3 | 4 | 4 | 1 | 1 | 3 |
| k | 14 | 8 | 12 | 3 | 4 | 9 |
| n = d * l | 768 | 2048 | 1024 | 1024 | 1024 | 1536 |
| m = d * k | 3586 | 4096 | 3072 | 3072 | 4096 | 4608 |
| η (= $\|E\|_\infty$) | 6 | 7 | 7 | 3 | 6 | 3 |

TABLE 3-continued

Parameters of a digital signature scheme according to embodiments in the lossy mode. Parameter sets 1 and 2 follow the q, d, l, η, w, β chosen in [DKL + 18] and [KLS18], then derive m, expected repetitions, LWE hardness and so on. Parameter sets 3 to 6 use different parameters. Parameter sets 5 and 6 are designed to be comparable with the security levels of qTESLA-p-I & qTESLA-p-III [ABB + 19] and Dilithium-QROM "recommended" and "very high" in [KLS18].

| Parameters | 1 | 2 | 3 | 4 | 5 | 6 |
|---|---|---|---|---|---|---|
| w = #1's in c | 60 | 46 | 60 | 36 | 36 | 46 |
| $\log_2(|B_1|)$ | 18 | 20 | 20 | 18 | 20 | 19 |
| β | 325 | 322 | 375 | 108 | 216 | 138 |
| Expected repetitions | 85.3 | 3.51 | 3.00 | 3.54 | 2.33 | 3.36 |
| LWE security | 122.8 | 165.1 | 120.0 | 127.6 | 138.1 | 182.5 |
| Public key size (bytes) | 10336 | 23072 | 11936 | 10400 | 13856 | 16736 |
| Signature size (bytes) | 2247 | 11589 | 4007.5 | 3588.5 | 3588.5 | 5765.8 |

Proof. First note that m is larger than n. Otherwise, if m=n and A is invertible, then z exists for any $c \in B^{1 \times h}$.

To understand how small m can be, consider the following lattice:

$$\Lambda := \{t \in \mathbb{Z}^{n+h+m} | [A^T | Y^T | I_m] t = 0 \pmod{q}\}$$

The determinant of $\Lambda$ is $q^m$. Define a set $$S = \left[-\frac{q}{2}, \frac{q}{2}\right]^n \times \left[-\frac{|B|}{2}, \frac{|B|}{2}\right]^h \times \left[-\frac{|B_1|}{2}, \frac{|B_1|}{2}\right]^m$$

which is a convex subset of $\mathbb{R}^{n+h+m}$. If we assume Gaussian heuristic, then for any $v \in \mathbb{Z}^m$, fix a vector $t \in \mathbb{Z}^{n+h+m}$ such that $[A^T | Y^T | I_m] \cdot t = v \pmod{q}$, the number of elements in $\Lambda + t \cap S$ is expected to be $N := q^n \cdot |B|^h \cdot |B_1|^m / q^m$.

Hence, if $N/|B|^h$ is negligible, i.e., $q^n \cdot |B_1|^m / q^m$ is negligible, then the probability statement in the theorem holds.

Concrete parameters. Assuming a digital signature scheme according to embodiments is instantiated over a module over $R := \mathbb{Z}[x]/(x^d+1)$, where d is a power-of-two. Let $A \in R^{l \times k}$ (therefore $n = d \cdot l$, $m = d \cdot k$, $h = d$). The parameters are determined in the following order: first pick q, d, l, $|B_1|$. Then chose m so that:

$$m \geq \frac{\kappa + n \log q}{\log q - \log_2 |B_1|}$$

Following [DKL+18, Page 27], we choose β so that the probability of $\|cE\|_\infty > \beta$ is less than $2^{-128}$. Here β either matches β from [DKL+18], or β is chosen to be exactly w·η, where w is the weight of c.

The probability that $rA - cE \in Good$ is lower bounded by $$\left(\frac{|B_1| - \beta}{|B_1|}\right)^m$$

Currently, the parameter estimation does not include the public-key size optimization from [DKL+18, Page 27] (i.e., by dropping bits from Y). So the PK includes the 256-bit seed to generate A and Y which is of size m $\log_2$ q. The signature size is n $\log_2$ q plus d+w bits to store the challenge c.

B. Parameter Estimation Based on the ABDD Problem

The parameter m, the width of the public key, can be further reduced in order to reduce the public key size and the number of rejections, the savings come with a cost of additionally assuming the hardness of the ABDD problem. This subsection first explains a model of estimating the cost of the ABDD problem using the BKZ algorithm, then explains the parameters of a digital signature scheme according to embodiments.

Estimating the cost of solving the ABDD problem using BKZ. One method of solving ABDD is to treat the entire w*+cY as the target vector for the standard bounded distance decoding problem (cf. Definition 3.1), and then use BKZ to solve the BDD problem.

Let $A \in \mathbb{Z}_q^{n \times m}$, $t = A^T z + E \pmod{q}$ be such a BDD instance. To express the basis of the integer lattice used in the attack, the BDD instance is presented in its Hermite normal form. Let $\overline{A}$ be the first n×n part of A, assuming it is invertible. Then $$t^T = z^T A + E^T + q k^T = z^T [\overline{A}, A'] + E^T + q[\overline{k}^T | k'^T] = (z^T \overline{A})[I | \overline{A}^{-1} \cdot A'] + E^T + q[\overline{k}^T | k'^T],$$

where $k \in \mathbb{Z}^m$, $\overline{k}$, $k'$ are the top n and bottom m−n entries of k.

Let $A'' := \overline{A}^{-1} \cdot A'$.

Let $B := \begin{pmatrix} I_n & 0 \\ A''^T & q I_{m-n} \end{pmatrix}$.

Then $B \cdot \begin{pmatrix} \overline{A}^T z + q \overline{k} \\ k' \end{pmatrix} - t = -E$.

So the problem can be solved by running an approximate-CVP solver given the basis B and target t, or running an approximate-SVP solver on $$B' := \begin{pmatrix} B & t \\ 0 & 1 \end{pmatrix}.$$

A common cost model for estimating the running time of BKZ for solving approximate-SVP is the following: Let h be the dimension of the lattice (h(B')=m+1). δ be the approximation factor. Following [APS15, ACD+18], sieving is used as the SVP oracle with time complexity $2^{0.292\theta + 16.4}$ in the block size θ. BKZ is expected to return a vector of length $\delta^h \det^{1/h}$ for a lattice of dimension h. Hence the smallest block size θ achieving the needed δ corresponding to the length of E was found, which can be obtained from $$\frac{\|E\|_2}{\det^{1/h}} = \delta^h.$$

Finally, the heuristic $$\delta \approx \left(\frac{\theta}{2\pi e}(\pi\theta)^{1/\theta}\right)^{\frac{1}{2(\theta-1)}}$$

was used to determine the relationship between $\theta$ and $\delta$, and the total time complexity of BKZ with block size $\theta$, dimension h as $8h \cdot \text{time}(SVP) = 8h \cdot 2^{0.292\theta + 16.4}$ [Che13, APS15].

TABLE 4

Parameters of a digital signature method according to embodiments assuming the hardness of ABDD. Parameter sets 1 and 2 follow the q, d, l, $\eta$, w, $\beta$ chosen in [DKL + 18] and [KLS18], then derive m, $\delta$, $\theta$, the expected repetition, ABDD and LWE hardness according to the hardness of using BKZ to solve the ABDD problem.

| Parameters | 1 | 2 | 3 | 4 | 5 | 6 |
|---|---|---|---|---|---|---|
| $\log_2 q$ | 23 | 45 | 31 | 27 | 27 | 29 |
| d | 256 | 512 | 256 | 1024 | 1024 | 512 |
| l | 3 | 4 | 4 | 1 | 1 | 3 |
| k | 6 | 5 | 7 | 2 | 2 | 5 |
| n = d * l | 768 | 2048 | 1024 | 1024 | 1024 | 1536 |
| m = d * k | 1526 | 2560 | 1792 | 2048 | 2048 | 2560 |
| $\eta$ $(=\|E\|_\infty)$ | 6 | 7 | 7 | 3 | 6 | 3 |
| w = #1's in c | 60 | 46 | 60 | 36 | 36 | 46 |
| $\log_2(|B_1|)$ | 18 | 20 | 20 | 18 | 20 | 19 |
| $\beta$ | 325 | 322 | 375 | 108 | 216 | 138 |
| Expected repetitions | 6.72 | 2.20 | 1.90 | 2.33 | 1.52 | 1.96 |
| BKZ approx. factor $\delta$ | 1.0053 | 1.0045 | 1.0046 | 1.0034 | 1.0041 | 1.0035 |
| BKZ block-size $\theta$ | 258 | 332 | 315 | 500 | 388 | 492 |
| ABDD hardness | 103.2 | 126.8 | 121.4 | 175.4 | 142.6 | 173.1 |
| LWE security | 122.8 | 165.1 | 120.0 | 127.6 | 138.1 | 182.5 |
| Public key size (bytes) | 4448 | 14432 | 6976.0 | 6944.0 | 6944.0 | 9312 |
| Signature size (bytes) | 2247 | 11589 | 4007.5 | 3588.5 | 3588.5 | 5765.8 |

Concrete parameters. The parameters are determined in the following order: first pick q, d, l, $|B_1|$, then derive m, $\delta$, $\theta$, the expected repetition, ABDD and LWE hardness according to the hardness of using BKZ to solve the ABDD problem.

VIII. COMPUTER SYSTEM

Figure 8:
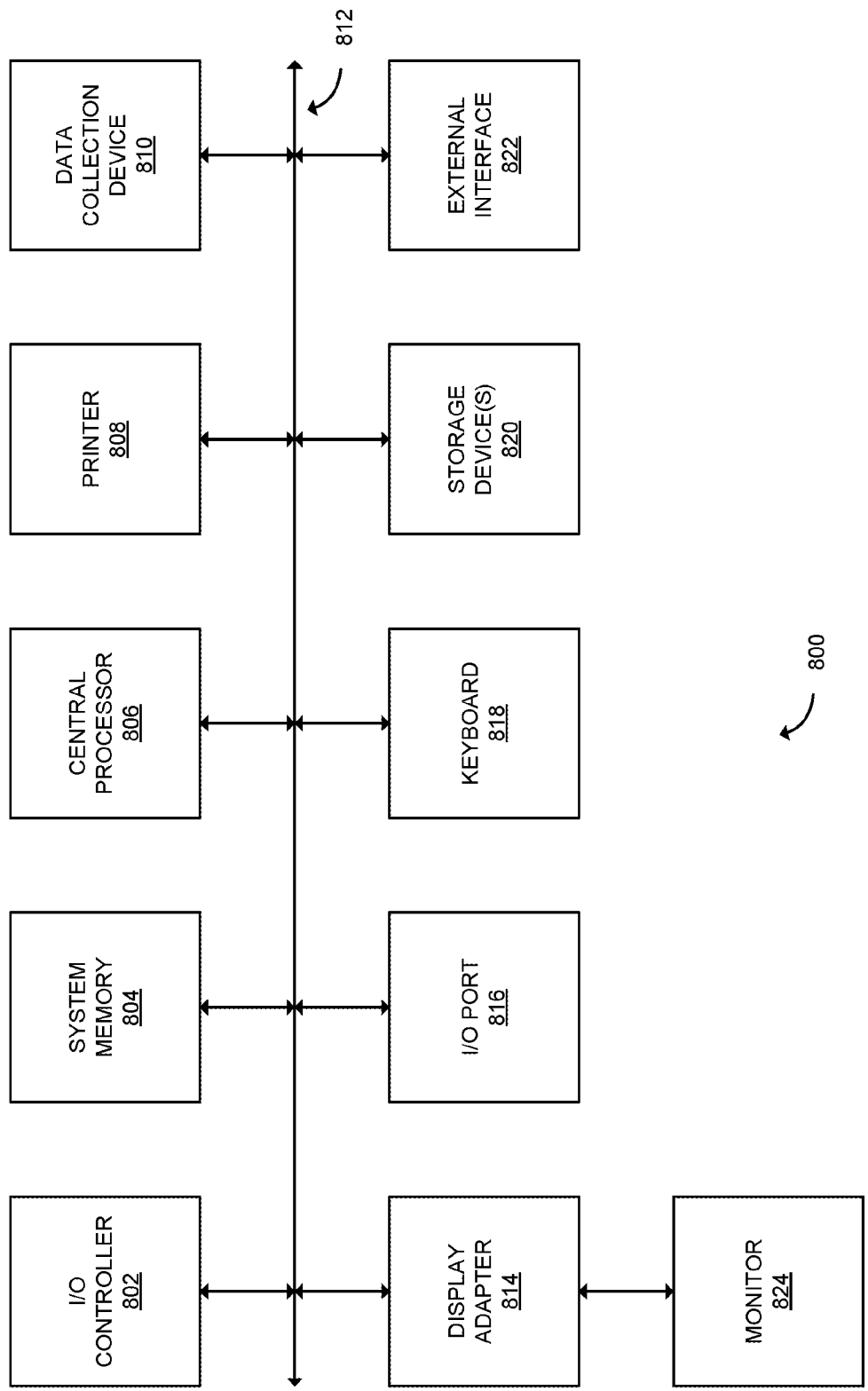
FIG. 8 shows a computer system according to some embodiments.

Any of the computer systems mentioned herein may utilize any suitable number of subsystems. Examples of such subsystems are shown in FIG. 8 in computer system 800. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 8 are interconnected via a system bus 812. Additional subsystems such as a printer 808, keyboard 818, storage device(s) 820, monitor 824 (e.g., a display screen, such as an LED), which is coupled to display adapter 814, and others are shown. Peripherals and input/output (I/O) devices, which couple to I/O controller 802, can be connected to the computer system by any number of means known in the art such as input/output (I/O) port 816 (e.g., USB, FireWire®). For example, I/O port 816 or external interface 822 (e.g. Ethernet, Wi-Fi, etc.) can be used to connect computer system 800 to a wide area network such as the Internet, a mouse input device, or a scanner. The interconnection via system bus 812 allows the central processor 806 to communicate with each subsystem and to control the execution of a plurality of instructions from system memory 804 or the storage device(s) 820 (e.g., a fixed disk, such as a hard drive, or optical disk), as well as the exchange of information between subsystems. The system memory 804 and/or the storage device(s) 820 may embody a computer readable medium. Another subsystem is a data collection device 810, such as a camera, microphone, accelerometer, and the like. Any of the data mentioned herein can be output from one component to another component and can be output to the user.

A computer system can include a plurality of the same components or subsystems, e.g., connected together by external interface 822, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the present disclosure. However, other embodiments of the present disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

IX. REFERENCES

[ABB+19] Erdem Alkim, Paulo S. L. M. Barreto, Nina Bindel, Patrick Longa, and Jefferson E. Ricardini. The lattice-based digital signature scheme qtesla. *IARC Cryptology ePrint Archive*, 2019:85, 2019.

[ACD+18] Martin R. Albrecht, Benjamin R. Curtis, Amit Deo, Alex Davidson, Rachel Player, Eamonn W. Postlethwaite, Fernando Virdia, and Thomas Wunderer. Estimate all the {LWE, NTRU} schemes! In *Security and Cryptography for Networks—$11^{th}$ International Conference*, SCN 2018, Amalfi, Italy, Sep. 5-7, 2018, Proceedings, pages 351-367, 2018.

[APS15] Martin R. Albrecht, Rachel Player, and Sam Scott. On the concrete hardness of learning with errors. *J. Mathematical Cryptology*, 9(3):169-203, 2015.

[BG14] Shi Bai and Steven D. Galbraith. An improved compression technique for signatures based on learning with errors. In *CT-RSA*, volume 8366 of *Lecture Notes in Computer Science*, pages 28-47, Springer, 2014.

[BLP+13] Zvika Brakerski, Adeline Langlois, Chris Peikert, Oded Regev, and Damien Stehlé, Classical hardness of learning with errors. In *Proceedings of the forty-fifth annual ACM symposium on Theory of computing*, pages 575-584. ACM, 2013.

[Che13] Yuanmi Chen. *Réduction de rëseau et sécurité concréte du chiffrement complétement homomorphe*. PhD thesis, Paris 7, 2013.

[DDLL13] Léo Ducas, Alain Durmus, Tancrède Lepoint, and Vadim Lyubashevsky. Lattice signatures and bimodal gaussians. In *CRYPTO* (1), volume 8042 of *Lecture Notes in Computer Science*, pages 40-56. Springer, 2013.

[DKL+18] Léo Ducas, Eike Kiltz, Tancrède Lepoint, Vadim Lyubashevsky, Peter Schwabe, Gregor Seiler, and Damien Stehlé. Crystals-dilitium: A lattice-based digital signature scheme. *IACR Trans. Cryptogr. Hardw. Embed. Syst.*, 2018(1):238-268, 2018.

[DLL+18] Léo Ducas, Tancrède Lepoint, Vadim Lyubashevsky, Peter Schwabe, Gregor Seiler, and Damien Stehle. Crystals-dilitum: digital signatures from module lattices. 2018.

[FS86] Amos Fiat and Adi Shamir. How to prove yourself: Practical solutions to identification and signature problems. In *CRYPTO*, pages 186-194, 1986.

[GGH97] Oded Goldreich, Shafi Goldwasser, and Shai Halevi. Public-key cryptosystems from lattice reduction problems. In Burton S. Kaliski Jr., editor, *Advances in Cryptology—CRYPTO '97, $17^{th}$ Annual International Cryptology Conference*, Santa Barbara, California, USA, Aug. 17-21, 1997, proceedings, volume 1294 of LNCS, pages 112-131. Springer 1997.

[GLP12] Tim Güneysu, Vadim Lyubashevsky, and Thomas Pöppelmann. Practical lattice-based cryptography: A signature scheme for embedded systems. In *Cryptographic Hardware and Embedded Systems—CHES 2012-$14^{th}$ International Workshop*, Leuven, Belgium, Sep. 9-12, 2012. Proceedings, pages 530-547, 2012.

[GPV08] Craig Gentry, Chris Peikert, and Vinod Vaikuntanathan. Trapdoors for hard lattices and new cryptographic constructions. In *STOC*, pages 197-206, 2008.

[GS02] Craig Gentry and Mike Szydlo. Cryptanalysis of the revised NTRU signature scheme. In *International Con-*

*ference on the Theory and Applications of Cryptographic Techniques*, pages 299-320. Springer, 2002.

[HHP+03] Jeffrey Hoffstein, Nick Howgrave-Graham, Jill Pipher, Joseph H. Silverman, and William Whyte. NRTU-SIGN: digital signatures using the NTRU lattice. In *CT-RSA*, volume 2612 of *Lecture Notes in Computer Science*, pages 122-140. Springer, 2003.

[KLS18] Eike Kiltz, Vadim Lyubashevsky, and Christian Schaffner. A concrete treatment of fiat-shamir signatures in the quantum random-oracle model. In *Annual International Conference on the Theory and Applications of Cryptographic Techniques*, pages 552-586. Springer, 2018.

[Lyu09] Vadim Lyubashevsky. Fiat-shamir with aborts: Applications to lattice and fatoring-based signatures. In *ASIACRYPT*, volume 5912 of *Lecture Notes in Computer Science*, pages 598-616. Springer, 2009.

[Lyu12] Vadim Lyubashevsky. Lattice signatures without trapdoors. In *EUROCRYPT*, volume 7237 of *Lecture Notes in Computer Science*, pages 738-755. Springer, 2012.

[NR06] Phong Q. Nguyen and Oded Regev. Learning a parallelpiped: Cryptanalysis of GGH and NTRU signatures. In *Advances in Cryptology—EUROCRYPT 2006, $25^{th}$ annual International Conference on the Theory and Applications of Cryptographic Techniques, St. Petersburg, Russia, May 28-Jun. 1, 2006, Proceedings*, pages 271-288, 2006.

[Pei09] Chris Peikert. Public-key cryptosystems from the worst-case shortest vector problem: extended abstract. In *STOC*, pages 333-342, 2009.

[PRS17] Chris Peikert, Oded Regeb, and Noah Stephens-Davidowitz. Pseudorandomness of ring-lwe for any ring and modulus. In *ZSTOC*, pages 461-473. ACM, 2017.

[Reg09] Oded Regev. On lattices, learning with errors, random linear codes, and cryotography. *J. ACM*, 56(6), 2009.

What is claimed is:

1. A computer system comprising:
   a processor; and
   a non-transitory computer readable medium coupled to the processor, the non-transitory computer readable medium comprising code, executable by the processor for implementing a method comprising:
   generating a verification matrix A comprising a first plurality of elements, the first plurality of elements sampled from a uniform distribution;
   generating a secret matrix S comprising a second plurality of elements, the second plurality of elements sampled from the uniform distribution;
   generating an error matrix E comprising a third plurality of elements, the third plurality of elements sampled from a non-uniform distribution;
   generating a public matrix Y using a modulus q as Y=SA+E mod q;
   generating a public key comprising the verification matrix A and the public matrix Y;
   generating a private key comprising the secret matrix S and the error matrix E;
   generating a digital signature for a message m using the private key and a random vector r, the random vector r, generated by sampling from the uniform distribution; and
   sending the digital signature and the message m to a verifying device that is configured to verify the signed message using the public key.

2. The computer system of claim 1, further comprising transmitting the public key and the private key to a signing device.

3. The computer system of claim 1, wherein the uniform distribution is implemented using a ring.

4. The computer system of claim 1, wherein the uniform distribution is bound by the modulus q, such that each element of the first plurality of elements and the second plurality of elements is less than or equal to the modulus q.

5. The computer system of claim 1, wherein each element of the first plurality of elements and the second plurality of elements is an integer greater than or equal to 0 and less than or equal to q−1.

6. The computer system of claim 1, wherein:
   the verification matrix A is an n by m matrix;
   the secret matrix S is an h by n matrix;
   the error matrix E is an h by m matrix;
   h is less than or equal to n; and
   m is greater than n.

7. The computer system of claim 1, wherein the computer system comprising a signing device, wherein generating the digital signature for the message m includes:
   (1) generating the random vector r by sampling from the uniform distribution;
   (2) generating a product vector rA by calculating a product of the random vector r and the verification matrix A;
   (3) generating a rounded product vector by discarding one or more least significant bits from each element of the product vector rA;
   (4) generating an intermediate vector using the rounded product vector modulus q;
   (5) generating a challenge vector c by hashing the message m and the intermediate vector;
   (6) calculating a verification vector v based on the product vector rA, the challenge vector c, and the error matrix E;
   (7) verifying that a plurality of elements of the verification vector v are within a predetermined interval of values;
   (8) generating a signature vector z based on the random vector r, the challenge vector c, and the secret matrix S, wherein the digital signature includes the signature vector z and the challenge vector c; and
   (9) sending the digital signature and the message m to the verifying device.

8. The computer system of claim 7, further comprising:
   if the plurality of elements of the verification vector v are not within the predetermined interval of values, repeating steps (1) through (7) until the plurality of elements of the verification vector v are within the predetermined interval of values.

9. The computer system of claim 7, wherein (6) calculating the verification vector v comprises calculating rA−cE.

10. The computer system of claim 7, wherein generating the signature vector z comprises calculating r+cS.

11. The computer system of claim 7, wherein step (7) comprises:
    determining a plurality of least significant bits of the verification vector v;
    calculating a norm of the plurality of least significant bits; and
    verifying that the norm is within the predetermined interval of values.

12. The computer system of claim 7, wherein the predetermined interval of values is determined based on a parameter $\beta$, wherein the parameter $\beta$ is greater than or equal to a norm of a product of the challenge vector c and the error matrix E with a specified probability.

13. The computer system of claim 12, wherein the specified probability comprises a probability greater than 99.99%.

14. The computer system of claim 7, wherein the signing device comprises an authorization computer, and wherein the message m comprises an authorization response message, the authorization response message indicating to the verifying device an authorization status of an interaction between the verifying device and a user device or a user of the user device.

15. A computer system comprising:
a processor; and
a non-transitory computer readable medium coupled to the processor, the non-transitory computer readable medium comprising code, executable by the processor for implementing a method comprising:
storing a public key received from a generating device and comprising a verification matrix A and a public matrix Y;
receiving, from a signing device, a message m and a digital signature including a signature vector z and a first challenge vector c;
generating a first verification vector v based on the verification matrix A, the public matrix Y, the signing vector z, and the first challenge vector c, wherein the signature vector z is based on a random vector r generated by sampling from a uniform distribution;
generating a rounded verification vector w by discarding one or more least significant bits from the verification vector v;
generating a second challenge vector by hashing the message m and the rounded verification vector w;
comparing the first challenge vector c to the second challenge vector;
verifying the signing device in response to the first challenge vector c matching the second challenge vector; and
after verifying the signing device and evaluating an authorization response message, performing an interaction with a user device or a user of the user device.

16. The computer system of claim 15, wherein the rounded verification vector w is equal to an intermediate vector generated by the signing device, wherein the intermediate vector is equal to a rounded product vector rA modulus q.

17. The computer system of claim 15, wherein the first verification vector $v = ZA - cY$.

18. The computer system of claim 15, wherein a device performing the verifying comprises a resource provider computer, wherein the signing device comprises an authorization computer, wherein the message m comprises the authorization response message.

19. The computer system of claim 15, wherein the first verification vector v is equal to a second verification vector generated by the signing device, the second verification vector based on a product vector rA, the first challenge vector c, and an error matrix E.

* * * * *